US010839052B2

(12) United States Patent
Williams et al.

(10) Patent No.: US 10,839,052 B2
(45) Date of Patent: Nov. 17, 2020

(54) METHOD AND SYSTEM OF HARDENING APPLICATIONS AGAINST SECURITY ATTACKS

(71) Applicants: Jeffrey Williams, Ashton, MD (US); Arshan Dabirsiaghi, Parkville, MD (US)

(72) Inventors: Jeffrey Williams, Ashton, MD (US); Arshan Dabirsiaghi, Parkville, MD (US)

( * ) Notice: Subject to any disclaimer, the term of this patent is extended or adjusted under 35 U.S.C. 154(b) by 92 days.

(21) Appl. No.: 15/590,009

(22) Filed: May 9, 2017

(65) Prior Publication Data

US 2017/0242987 A1 Aug. 24, 2017

Related U.S. Application Data

(63) Continuation-in-part of application No. 15/294,728, filed on Oct. 15, 2016, which is a continuation-in-part of application No. 15/000,030, filed on Jan. 18, 2016, now abandoned, which is a continuation-in-part of application No. 14/177,628, filed on Feb. 11, 2014, now Pat. No. 9,268,945, which is a continuation-in-part of application No. 13/466,527, filed on May 8, 2012, now Pat. No. 8,844,043, which is a continuation of application No. 12/870,367, filed on Aug. 27, 2010, now Pat. No. 8,458,798.

(60) Provisional application No. 62/241,897, filed on Oct. 15, 2015, provisional application No. 61/315,666, filed on Mar. 19, 2010.

(51) Int. Cl.

| | |
|---|---|
| ***G06F 21/00*** | (2013.01) |
| ***G06F 21/12*** | (2013.01) |
| ***G06F 21/55*** | (2013.01) |
| ***G06F 21/57*** | (2013.01) |
| ***H04L 29/06*** | (2006.01) |

(52) U.S. Cl.

CPC .......... *G06F 21/125* (2013.01); *G06F 21/128* (2013.01); *G06F 21/552* (2013.01); *G06F 21/554* (2013.01); *G06F 21/577* (2013.01); *H04L 63/1416* (2013.01); *H04L 63/20* (2013.01)

(58) Field of Classification Search

CPC ............................. G06F 21/125; G06F 21/554

See application file for complete search history.

(56) References Cited

U.S. PATENT DOCUMENTS

2001/0016040 A1* 8/2001 Imura ....................... G06F 3/14 379/354
2004/0030912 A1* 2/2004 Merkle, Jr. ............. G06F 21/10 726/26

(Continued)

*Primary Examiner* — Alexander Lagor
*Assistant Examiner* — Rodman Alexander Mahmoudi

(57) ABSTRACT

In one aspect, computerized method for hardening security of an application includes the step of modifying a set of instructions of an application to include at least one sensor adapted to capture a set of information snapshots from within the application in a running state. The method includes the step of analyzing, from within the application, the set of information snapshots from the at least one sensor. The method includes the step of detecting a presence, a status, and a configuration of a security defense mechanism based on an analysis of the information snapshots; invoking an appropriate hardening action to improve the security defense mechanism of the application.

16 Claims, 20 Drawing Sheets

(56) References Cited

U.S. PATENT DOCUMENTS

| | | | | |
|---|---|---|---|---|
| 2006/0277539 | A1* | 12/2006 | Amarasinghe .......... | G06F 21/53<br>717/168 |
| 2008/0214300 | A1* | 9/2008 | Williams .............. | G06F 21/125<br>463/29 |

* cited by examiner

| | Data | Resource |
|---|---|---|
| 701 DATA | "foo!" | doPost() -FooServlet.java@134 HttpServletRequest.getParameter("... |
| 702 TEST | "foo".equals("bar!"):FALSE | doPost() -FooServlet.java@138 "foo".equals("bar!") |
| 703 PROP | foo!bar!test! | doAction() -BusinessAction.java@2... StringBuilder.append("bar!test!") |
| 704 PROP | foo!test! | doAction() -BusinessAction.java@2... String.removed(4,7); |
| 705 DATA | foo!test!bad | setData-DataBean.java@25 StringBuilder.append("bad"); |
| 706 TEST | "foo!test!bad".matches("[a-z]*"):FALSE | checkAlpha() – StringUtils.java@136- Pattern.matcher("[a-z]*") |
| 707 TEST | foo%21bar%21bad | service() -- report/jsp.java@324 URLEncoder.encode() |
| 708 USE | <form...value=foo%21rest%bad/>...orm> | service() -- report/jsp.java@324 PrintWriter.write("<form><input Value=foo%21bar%21bad/></form>") |

Full context
-Object
-Params
-Return

Full stack trace

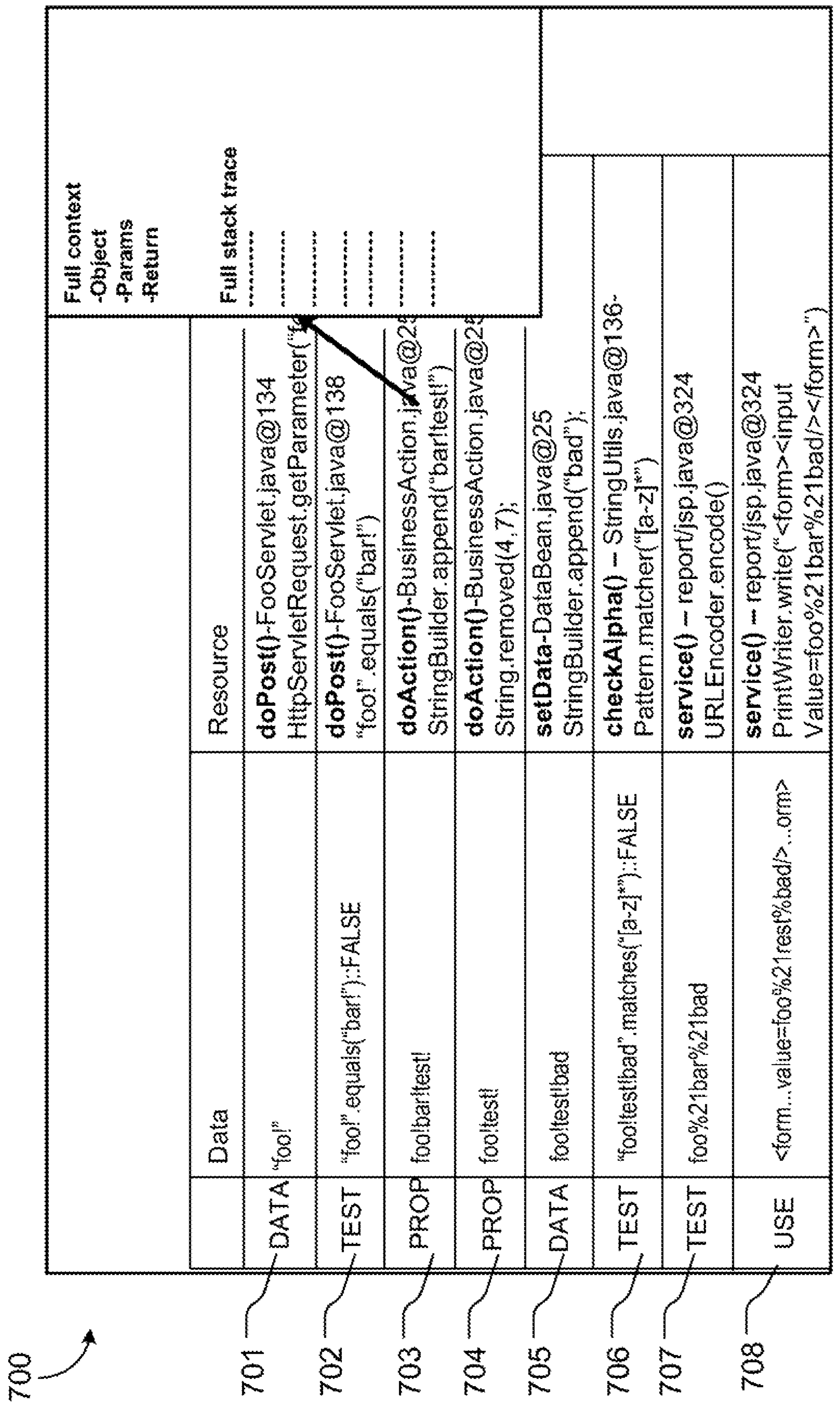

```xml
<?xml version="1.0" encoding="UTF-8"?>
<trace>
  <!--Trace generated by Aspect Security WhiteCell - http://www.aspectsecurity.com-->
  <timestamp value="Sun Dec 13 00:58:25 EST 2008"/>
  <event type="DATA">
    <context>
      <class type="org.apache.catalina.connector.RequestFacade" value="org.apache.catalina.connector.RequestFacade@ee6ad6"/>
      <method name="getParameterValues" return="[Ljava.lang.String;@a826da"/>
      <parameters types="java.lang.String" values="&quot;HelpFile&quot;"/>
    </context>
    <stack>
      <call level="1" value="org.apache.catalina.connector.RequestFacade.getParameterValues(RequestFacade.java:388)"/>
      ...
    </stack>
  </event>
  <event type="TEST">
    <context>
      <class type="java.util.regex.Pattern" value="\.help"/>
      <method name="matcher" return="java.util.regex.Matcher[pattern=\.help region=0,12 lastmatch=]"/>
      <parameters types="java.lang.CharSequence" values="&quot;foo;bar&cat1{0, 1, 2, 3, 4, 5, 6, 7, 8, 8, 10,11}12*&quot;"/>
    </context>
    <stack>...</stack>
  </event>
  <event type="USE-FileInjection">
    <context>
      <class type="java.io.File" value="C:\Users\jwilliams\Desktop\apache-tomc...apps\WebGoat\lesson_plans\foo;bar&cat1
              {0, 1, 2, 3, 4, 5, 6, 7, 8, 8, 10, 11}0*"/>
      <method name="" return="null"/>
      <parameters types="java.io.File,java.lang.String" values="C:\Users\jwilliams\Desktop\apache-tomcat-6.0.18\
              webapps\WebGoat\lesson_plans,&quot;foo;bar&cat1{0, 1, 2, 3, 4, 5, 6, 7, 8, 8, 10, 11}12*&quot;"/>
    </context>
    <stack>...</stack>
  </event>
</trace>
```

FIG. 8

WhiteCell Vulnerability: Cross-site Scripting (FIHQ-L1SE-POIU-TMNZ-XQFA)

| Vulnerability Summary | Events Details | Remediation | HTTP Info | References |

Current State: Confirmed

The application has a cross-site scripting vulnerability which terminates at JspWriterImpl.line 21. The data is originally pulled from a "request.getParameter()" call on FooServlet.java:line 134. What's shown is a summary of the user-controlled data that is eventually fed into the application's dangerous sink.

1401

| CREATION | foo | doPost() at FooServlet.java@134 |
| PROPAGATION | "foo" | doPost() at FooServlet.java@136 |
| PROPAGATION | he said "foo" | doAction() at ShowFundsAction.java@912 |
| TRIGGER | he said "foo" to her | print() at JspWriterImpl.java@21 |

1400

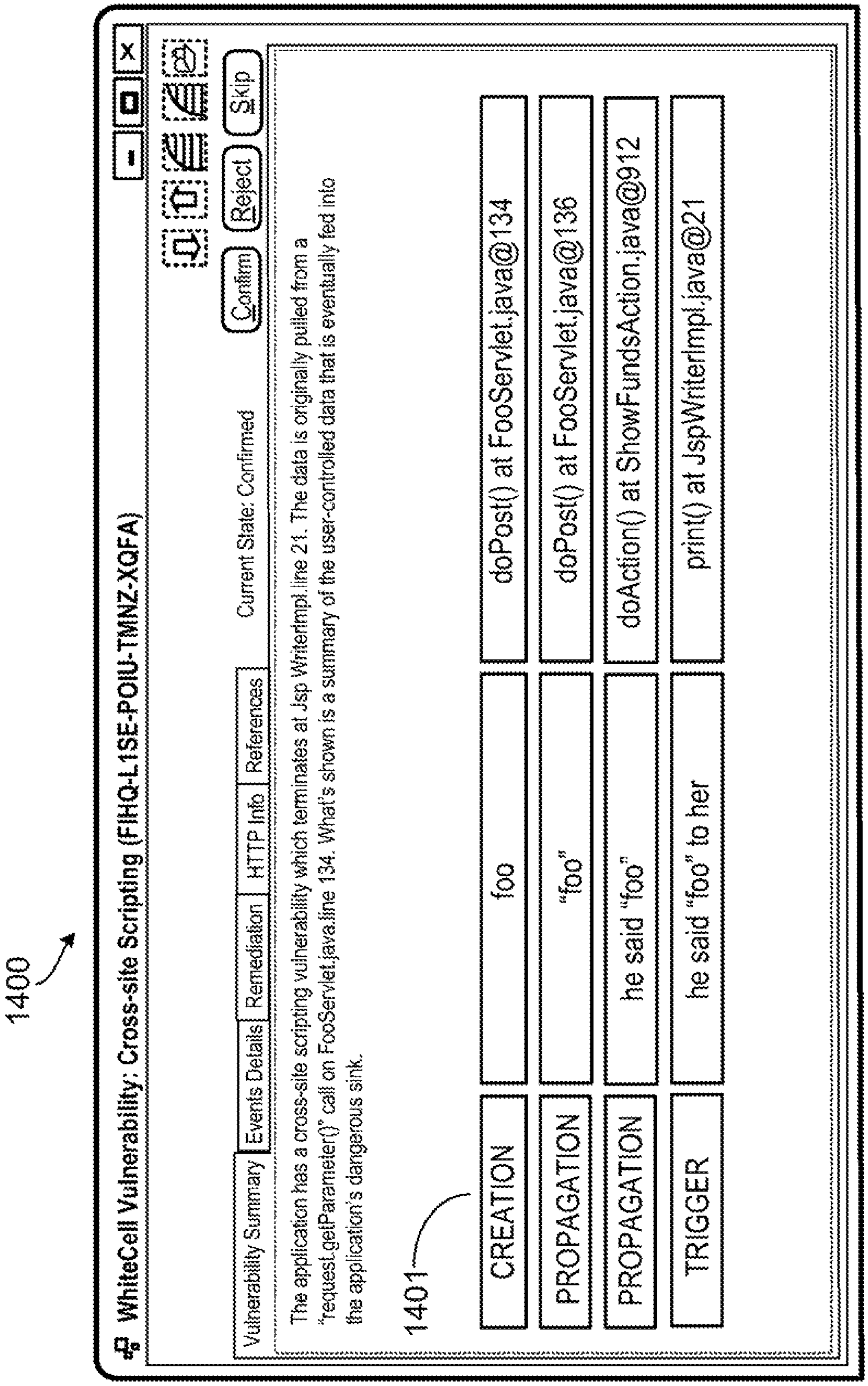

FIG. 14

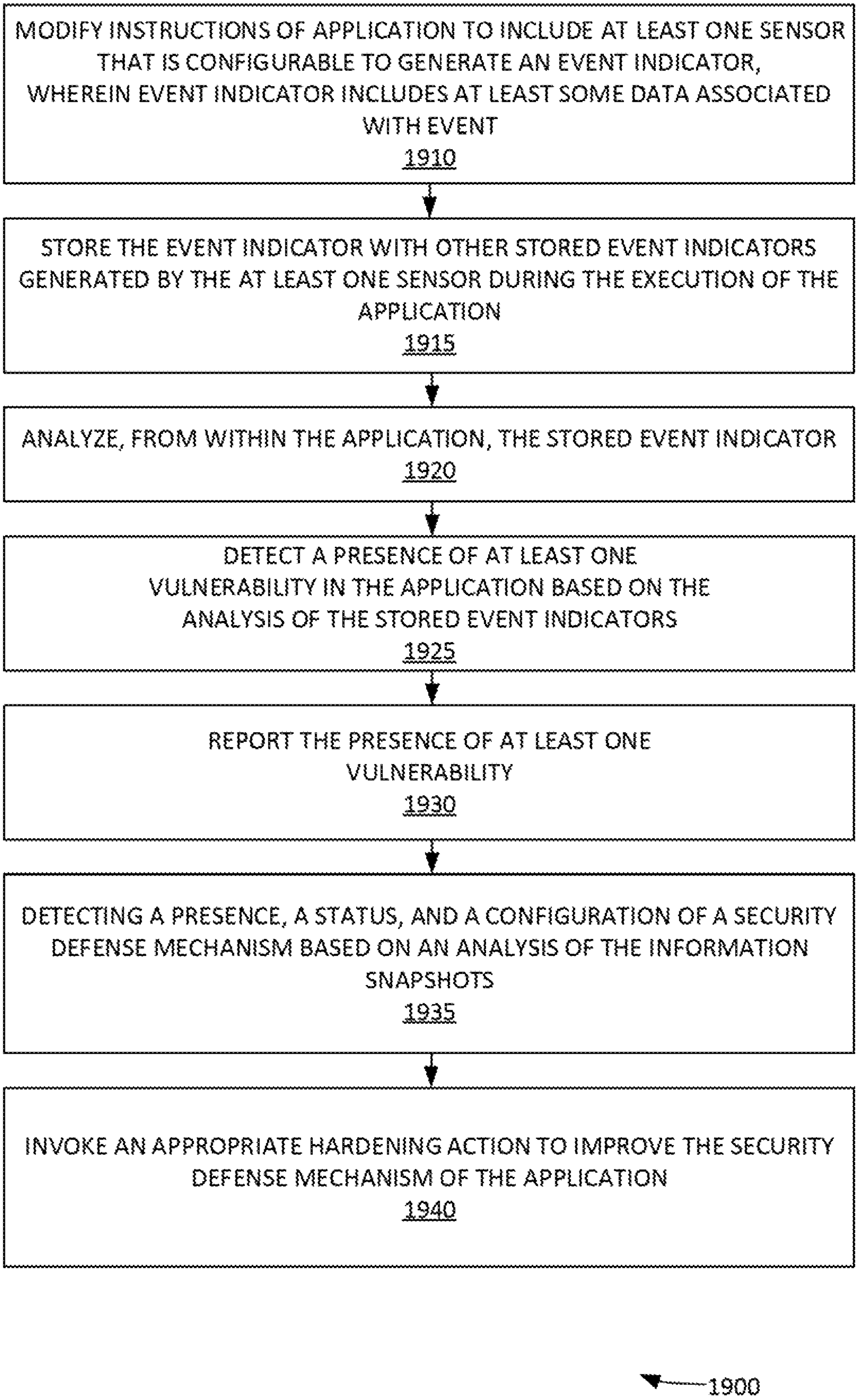

FIGURE 19

```
┌─────────────────────────────────────────────────────────────┐
│ MODIFY INSTRUCTIONS OF APPLICATION TO INCLUDE AT LEAST ONE  │
│ SENSOR THAT IS CONFIGURABLE TO GENERATE AN EVENT INDICATOR, │
│ WHEREIN EVENT INDICATOR INCLUDES AT LEAST SOME DATA         │
│ ASSOCIATED WITH EVENT                                       │
│ 1910                                                        │
└─────────────────────────────────────────────────────────────┘
                              │
                              ▼
┌─────────────────────────────────────────────────────────────┐
│ STORE THE EVENT INDICATOR WITH OTHER STORED EVENT INDICATORS│
│ GENERATED BY THE AT LEAST ONE SENSOR DURING THE EXECUTION   │
│ OF THE APPLICATION                                          │
│ 1915                                                        │
└─────────────────────────────────────────────────────────────┘
                              │
                              ▼
┌─────────────────────────────────────────────────────────────┐
│ ANALYZE, FROM WITHIN THE APPLICATION, THE STORED EVENT      │
│ INDICATOR                                                   │
│ 1920                                                        │
└─────────────────────────────────────────────────────────────┘
                              │
                              ▼
┌─────────────────────────────────────────────────────────────┐
│ DETECT A PRESENCE OF AT LEAST ONE VULNERABILITY IN THE      │
│ APPLICATION BASED ON THE ANALYSIS OF THE STORED EVENT       │
│ INDICATORS                                                  │
│ 1925                                                        │
└─────────────────────────────────────────────────────────────┘
                              │
                              ▼
┌─────────────────────────────────────────────────────────────┐
│ REPORT THE PRESENCE OF AT LEAST ONE VULNERABILITY           │
│ 1930                                                        │
└─────────────────────────────────────────────────────────────┘
                              │
                              ▼
┌─────────────────────────────────────────────────────────────┐
│ DETECTING A PRESENCE, A STATUS, AND A CONFIGURATION OF A    │
│ SECURITY DEFENSE MECHANISM BASED ON AN ANALYSIS OF THE      │
│ INFORMATION SNAPSHOTS                                       │
│ 1935                                                        │
└─────────────────────────────────────────────────────────────┘
                              │
                              ▼
┌─────────────────────────────────────────────────────────────┐
│ INVOKE AN APPROPRIATE HARDENING ACTION TO IMPROVE THE       │
│ SECURITY DEFENSE MECHANISM OF THE APPLICATION               │
│ 1940                                                        │
└─────────────────────────────────────────────────────────────┘

                                                      ◄──1900

```

METHOD AND SYSTEM OF HARDENING APPLICATIONS AGAINST SECURITY ATTACKS

CROSS-REFERENCE TO RELATED APPLICATIONS

This application claims priority to and is a continuation-in-part of U.S. patent application Ser. No. 15/294,728 and filed on Oct. 15, 2016. U.S. patent application Ser. No. 15/294,728 claims priority to U.S. Provisional Application No. 62/408,775, filed on Oct. 15, 2016 and U.S. Provisional Application No. 62/241,897, filed on Oct. 15, 2015. U.S. patent application Ser. No. 15/294,728 is a continuation-in-part of U.S. application Ser. No. 15/000,030, filed on Jan. 18, 2016, which claims benefit to as a continuation-in-part of U.S. application Ser. No. 14/177,628 filed on Feb. 11, 2014 now U.S. Pat. No. 9,268,945, issued Feb. 23, 2016, which claims benefit to U.S. application Ser. No. 13/466,527, filed May 8, 2012, now U.S. Pat. No. 8,844,043, issued Sep. 23, 2014, which claims benefit to U.S. application Ser. No. 12/870,367, filed Aug. 27, 2010, now U.S. Pat. No. 8,458, 798, issued Jun. 4, 2013, which claims the benefit to U.S. Provisional Application Ser. No. 61/315,666, filed on Mar. 19, 2010. All of these prior applications are incorporated by reference in their entirety. These provisional and utility applications are hereby incorporated by reference in their entirety.

BACKGROUND

1. Field

This description relates to the field of hardening applications to improve resilience against security attacks on computer systems.

2. Related Art

For years, organizations have struggled to block attacks on vulnerable software applications. Application software controls finances, healthcare information, legal records, and even military defenses. Further, application software is growing and interconnecting at an unprecedented rate. This increasing reliance on software combined with common vulnerabilities and rapidly increasing complexity creates significant business risk stemming from the use of software applications. Accurately detecting and defending against attacks on these applications can minimize the likelihood of a breach even when the underlying software contains vulnerabilities.

Protecting the application software can involve a variety of different security defenses, such as input validation, authentication, authorization, encryption, escaping, parameterization, tokenization, and many others. For example, the application software not properly protect against SQL Injection attacks with escaping or parameterization. Or the application software may be missing access control checks designed to ensure that users only access authorized data and functions. In another example, the application software can include a logging capability to ensure that records of security-relevant events are captured for later analysis. The logging capability may be missing, weak, disabled, misconfigured, or not used properly. In this case, the application would not be able to capture the security-relevant events necessary identify attacks, perform intrusion analysis, or any other activity requiring complete logs. Other defenses may be missing, weak, disabled, misconfigured, or not used properly and would be apparent to one of ordinary skill in the art. Therefore, there exists a need fore better method of performing attack detection and protection in software applications and services.

BRIEF SUMMARY OF THE INVENTION

In one aspect, computerized method for hardening security of an application includes the step of modifying a set of instructions of an application to include at least one sensor adapted to capture a set of information snapshots from within the application in a running state. The method includes the step of analyzing, from within the application, the set of information snapshots from the at least one sensor. The method includes the step of detecting a presence, a status, and a configuration of a security defense mechanism based on an analysis of the information snapshots. The method includes the step of invoking an appropriate hardening action to improve the security defense mechanism of the application.

Optionally, the application hardening can be combined with an application vulnerability detection process or an application attack detection and prevention process. The application includes a web application, a web service, an application programming interface (API), a mobile application, a client application, a server application or an embedded application. The application includes a set of components comprising at least one of a runtime platform, a virtual machine, a set of application servers, an application framework, an application library, or an application module. The set of information snapshots can include information from a presence of set of security defenses, the application library, the application framework, a software-architecture detail, an application state, a backend connection, or an application configuration information. The hardening action includes an addition of a missing defense, a defense enhancement, an enabling of a defense, a modification of a defense configuration, or an addition of an invocation of the defense in a specified location of a set of code of the application. The hardening rules be specified in an external configuration. The step of invoking the appropriate hardening action to improve the security defenses of the application further includes the step of modifying a specified portion of code of the application for at least one method in the application; invoking at least one method to change a state or a configuration of the application replacing the specified portion of code for at least one method in the application; and modifying an application file or another data store associated with the application to link a new security defense code into the application. The security defense mechanism includes an authentication and forgery check, an authorization check, an input validation, an output escaping or encoding process, a data encryption, a logging process HTTP mechanism, a connection security process, a fraud prevention process, an integrity check, or security filters. The security defense mechanism can be centralized in the application module. The security defense mechanism can be distributed across the application code. The security defense mechanism can be enforced by an external component. The external component includes a web server application server, network switch, network router network firewall, operating system, or a web application firewall. The security defense mechanism can be located in the application platform, the application server, the application framework, the application library, the application module, the set of components used by the application, or a custom code segment of the application. A user can define a custom hardening action for the application. The step of modifying the set of instructions of the application to include at least one sensor adapted to capture the set of information snapshots from within the application in a running state further can include the step of dynamically patching the code segment at a run-time of the application. The code segment to be patched comprise a software component of the application or the application library.

BRIEF DESCRIPTION OF THE DRAWINGS

The present application can be best understood by reference to the following description taken in conjunction with the accompanying figures, in which like parts may be referred to by like numerals.

FIG. 7 illustrates an example of how analysis module detects a hardening opportunity for XSS prevention, according to some embodiments.

FIG. 8 is a screen-shot illustrating an example attack identified by analysis module, according to some embodiments.

FIGS. 12-18 are screen-shots illustrating various aspects of a graphical user interface used for reviewing results produced by the security-hardening system.

FIG. 19 is a flowchart of steps executed in accordance with implementations of the present disclosure.

Figure 1:
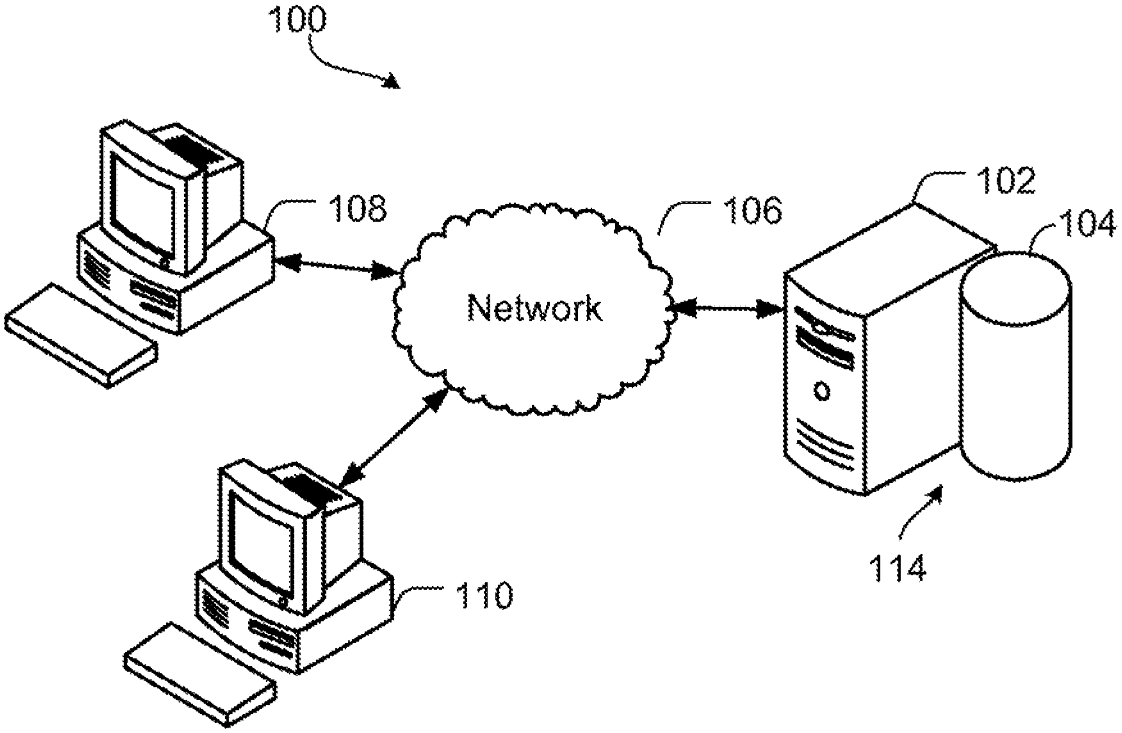
FIG. 1 is a schematic illustration of an example system in accordance with implementations of the present disclosure can include a plurality of clients and a computer system, according to some embodiments.

The Figures described above are a representative and are not an exhaustive with respect to embodying the invention.

DETAILED DESCRIPTION

Disclosed are a system method, and article of manufacture for hardening applications against security attacks. The following description is presented to enable a person of ordinary skill in the art to make and use the various embodiments. Descriptions of specific devices, techniques, and applications provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such, as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with, other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Attack can be any attempt to destroy, expose, alter, disable, steal, extract data from, corrupt, interfere with, gain unauthorized access to, or make unauthorized use of an asset (e.g. a computer application, etc.).

Application includes all forms of software code executing on computer hardware, including any virtualization hardware technology. An application could be a web application or web service running on a web or application server, a mobile application running on a device, a client or server application running on a desktop computer, or any other form of software running in a car, refrigerator, airplane, weapon system, phone, drone, or robot.

Bot can be a type of malware that allows an attack to take control over an affected computer.

Common Vulnerabilities and Exposures (CVE) can be a system that provides a reference-method for publicly known information-security vulnerabilities and exposures.

Configuration information can include property files, xml documents, and initialization files, and the like.

Honeypot mechanism can be a computer security a mechanism set to detect, deflect, or, in some manner, counteract attempts at unauthorized use of information systems.

Library can be a collection of subprograms, modules, or components.

Sensor is a piece of executable code that extracts data from within an executing application. A sensor can also be used to alter the execution of the application. A sensor is wrapped in exception handling logic that ensures that the application's execution is not unintentionally modified. A sensor can be a passive sensor, an active sensor, and a response sensor.

SQL injection is a code injection technique used to attack data-driven applications, in which nefarious SQL statements are inserted into an entry field for execution.

Throwing an exception can include creating are exception object and handing it to a runtime system.

Virtual patch can be an easily deployed implementation of a security policy meant to prevent an exploit from occurring as a result of a newly discovered vulnerability.

Example Systems and Processes

Referring now to FIG. 1, a schematic illustration of an example system 100 in accordance with implementations of the present disclosure can include a plurality of clients 108, 110, and a computer system 114, according to some embodiments. The computer system 114 can include server 102 and a database 104. In some implementations, the system 100 can represent a client/server system supporting multiple computer systems, (e.g., computer system 114) including one or more clients (e.g., clients 108, 110) and/or one or more servers (e.g., server 102) that are connectively coupled for communication with one another over a network 106. In some implementations, the clients (e.g., clients 108, 110) can be directly connected to the one or more servers (e.g., server 102) (without connecting by way of network 106).

Clients 108, 110 can represent various forms of processing devices including, but not limited to, a desktop computer, a laptop computer, a handheld computer, a personal digital assistant (PDA), a cellular telephone, a network appliance camera, a smart phone, an enhanced general packet radio service (EGPRS) mobile phone, a media player, a navigation device, an email device, a game console, or a combination of any two or more of these data processing devices or other data processing devices. Each client 108, 110 can access application software on the server 102.

In some implementations, the client devices 108, 110 can communicate wirelessly through a communication interface (not shown), which can include digital signal processing circuitry where necessary. The communication interface can provide for communications under various modes or protocols, such as GSM voice calls, SMS, EMS, or MMS messaging, CDMA, TDMA, PDC, WCDMA, CDMA2000, or GPRS, among others. For example, the communication can occur through a radio-frequency transceiver (not shown). In addition, short-range communication can occur, such as using a Bluetooth, WiFi, or other such transceiver.

In some implementations, the system 100 can be a distributed client/server system that spans one or more networks such as network 106. The system 100 can be a cloud computing system. The network 106 can be a large computer network, such as a local area network (LAN), wide area network (WAN), the Internet, a cellular network, or a combination thereof connecting any number of mobile clients, fixed clients and servers. In some implementations, each client (e.g., clients 108, 110) can communicate with the server 102 via a virtual private network (VPN), Secure Shell (SSH) tunnel, or other secure network connection. In some implementations the network 106 can include the Internet, a wireless service network and can include the Public Switched Telephone Network (PSTN). In other implementations, the network 106 can include a corporate network (e.g., an intranet) and one or more wireless access points.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) a communicate with the server 102 by way of network 108. In some implementations, a user can invoke applications available on the server 102 in a web browser running on a client (e.g., clients 108, 110). Each application can individually access data from one or more repository resources (e.g., database 104). For example, the server 102 can access database 104.

Applications can be provided either by the hosted computing system or from third party systems that are separate from the hosted computer system. Such applications can include services that provide information about locations of various users (as determined, e.g., from GPS can their mobile devices), services that provide news and weather feeds, and other such services. The applications can also include, for example, email and other messaging applications, productivity applications such as spreadsheets and word processors, mapping applications and mash-ups of various applications that can be presented together in a single presentation.

Figure 2:
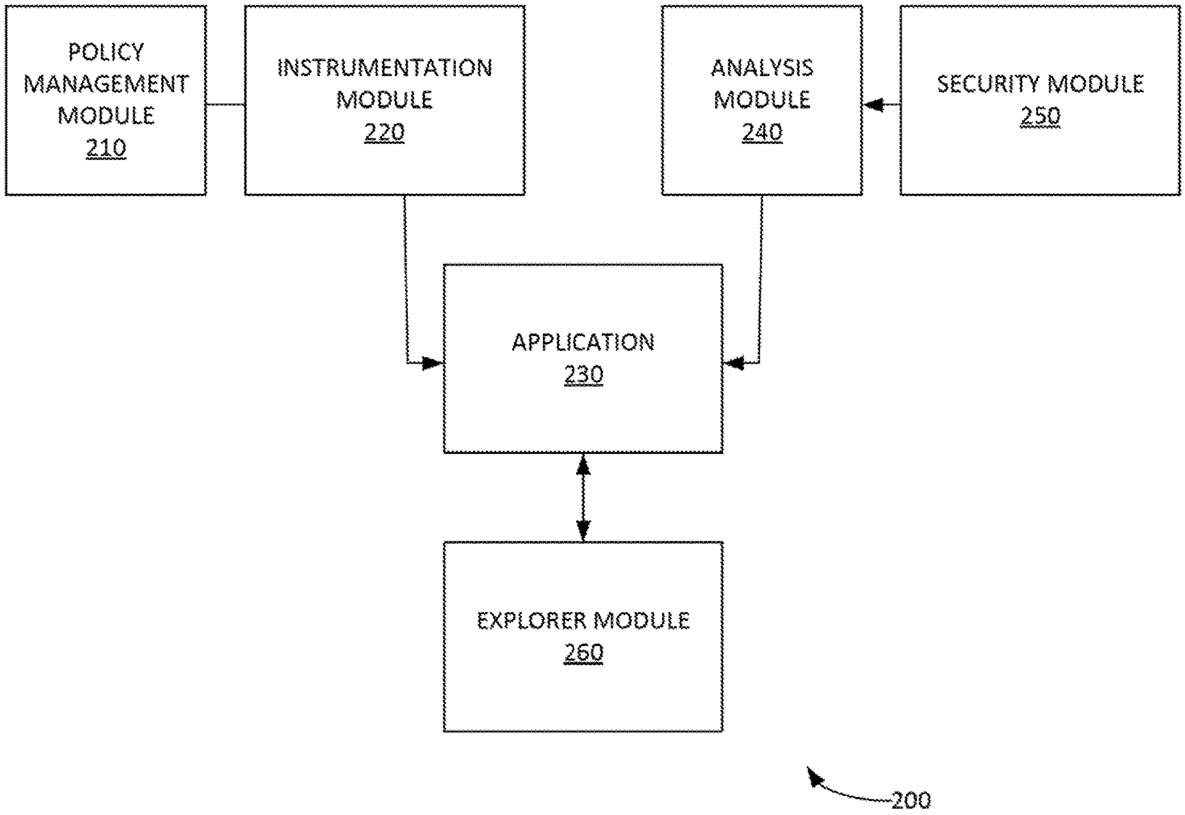
FIG. 2 is a block diagram of security hardening system in accordance with implementations of the present disclosure that can detect attacks and invoke appropriate hardening actions in the software, according to some embodiments.

FIG. 2 is a block diagram of security hardening system 200 in accordance with implementations of the present disclosure that can detect attacks and invoke appropriate hardening actions in the software, according to some embodiments. Security-hardening system 200 can be implemented as a client/server system, an example of which can include system 100 of FIG. 1. Security-hardening system 200 can be implemented using client 108, network 106, and computer system 114 that includes server 102 and database 104.

Security-hardening system 200 includes a policy-management module 210, an instrumentation module 220 that is used to instrument an application 230, an analysis module 240 that collects and analyzes data from the instrumented application 230, a security module 250 that takes actions to harden the security of the instrumented application, and an explorer module 260 that enables an administrative user to manage the results of the hardening. Security-hardening system 200 car its components can be written in or based on any appropriate computer language including Java, C, C++, Visual Basic, Perl, Python and others. Security-hardening system 200 can reside on single or multiple computers. Security-hardening system 200 can include an interface for communicating with other computer systems. It is noted that application 230 can be a web application, a web service, an application programming interface (API), a mobile application, a client application, a server application, an embedded application, etc.

Security-hardening system 200 can operates based on a set of security rules specified with policy-management module 210. These security rules control the process of hardening the security of application 230 by security-hardening system 200. The security rules have a two-fold purpose. First, the security rules list specific conditions that, when satisfied, indicate the need for adding, enhancing, enabling, modifying the configuration of, or adding invocations of a defense for application 230. More specifically, security rules identify a pattern of information snapshots that indicate a need for security hardening. Second, the rules may define the source and type of the information to be captured in an information snapshot application 230. This can include, inter alia: the presence or absence of security defenses, libraries and frameworks, software, architecture details, application state, backend connections, configuration information, and/or any other information relevant to the operation of applications security defenses. In particular, the rule identifies can specify the sensors to be instrumented into the application by instrumentation module 220. Multiple rules can be further grouped into policies. It is noted that a security policy can be a collection of one or more security rules that are designed to handle a particular type of hardening. Security polices can be designed to ensure that security is enforced for particular components and/or URLs. For example, a user may create a policy that ensures defenses are in place for attacks such as cross-site scripting, SQL injection, cross-site request forgery, padding oracle attacks, brute force attacks, and attempts to bypass authorization.

Security-hardening system 200 inserts passive, active, and response software sensors 314 into each of the methods designated by the events in the security rules. This can be a process referred to as 'instrumentation'. During execution of application 230, each inserted passive sensor generates an information snapshot that is collected and analyzed by analysis module 240 at various times during the operation of the application. This collected data, referred to as an 'information snapshot', is a collection of data collection from the application being hardened. For example, the information snapshot can include various details extracted from the application, such as whether defenses are enabled, how defenses are configured, details of algorithms or security rules enforced, libraries or components used, frameworks used and/or other information related to the security of the application. Some sensors may gather information by invoking methods anywhere within the application stack to extract details.

Analysis module 240 collects the generated events from application 230 and analyses the data for the need for hardening. The analysis may be performed during the execution of application 230, before the application runs, and/or after the application has completed its execution. In one example, analysis module 240 collects the generated information snapshots.

When analysis module 240 determines that a particular hardening rule has been satisfied (e.g. the rule criteria are matched), security-hardening system 200 directs the application to take one or more hardening actions. Hardening actions are carried out by the security enhancing code. In some examples, this security enhancing code may be instrumented into the code and in other cases may be part of Security-hardening system 200.

Hardening actions can include, inter alia: adding a missing defense; enhancing a defense; enabling a defense; modifying the configuration of a defense; adding invocations of the defense in the code; etc.

Figure 3:
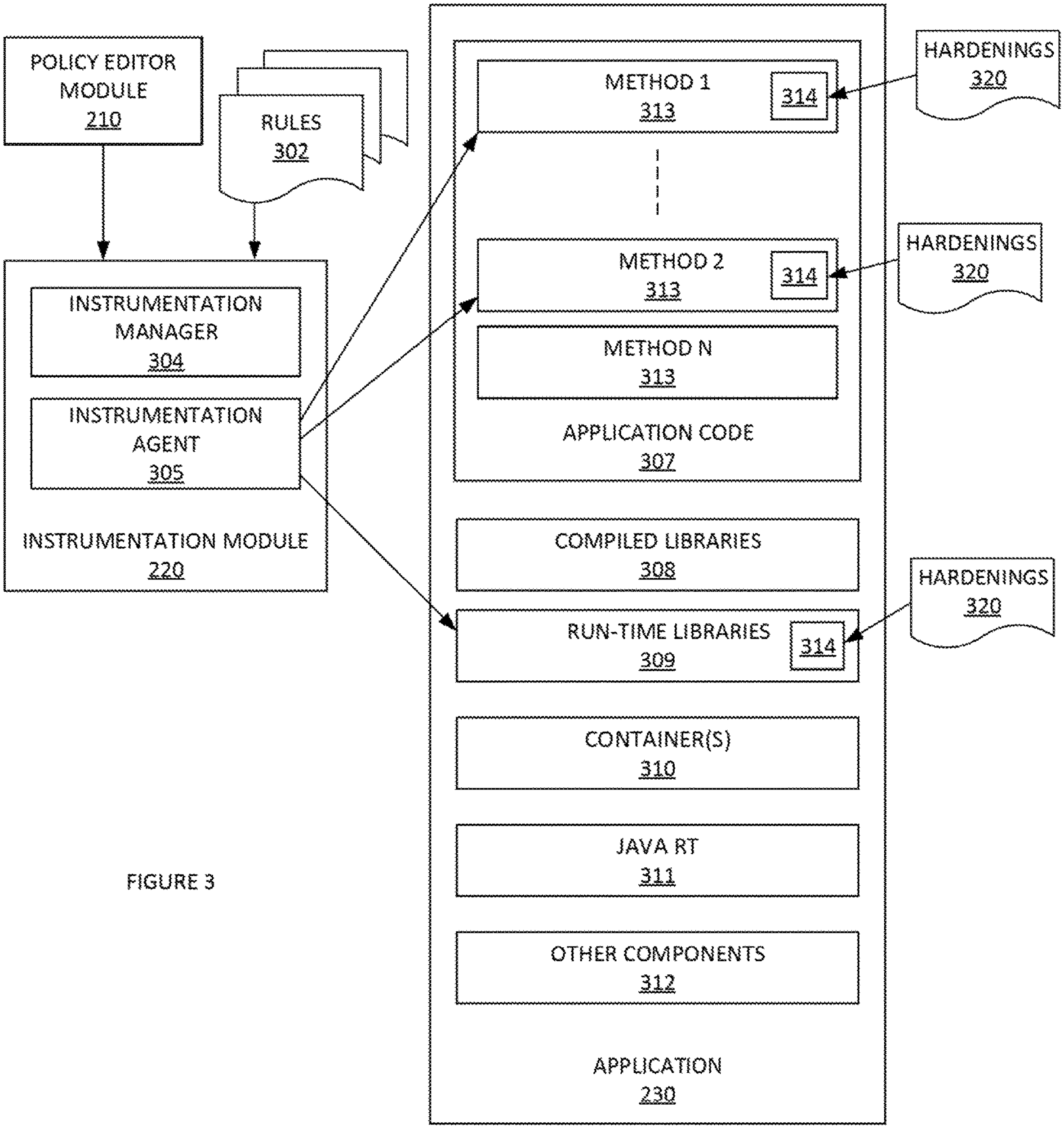
FIG. 3 is a block diagram that illustrates a view of security-hardening system as it instruments application, according to some embodiments.

FIG. 3 is a block diagram that illustrates a view of security-hardening system 200 as it instruments application 230, according to some embodiments. In particular, FIG. 3 is directed to the instrumentation of application 230 with the help of policy-management module 210 and instrumentation module 220.

Application 230 can include number of software components. In some implementations, application 230 includes application code 307, compiled libraries 308 run-time libraries 309 container classes 310, virtual machine 311, and other software components 312. These components can also include methods or subroutines 313, such as shown in more detail for application code 307. A method and/or a subroutine can include a sequence of programming statements to perform an action, a set of input parameters to customize those actions and/or a return value. In object-oriented technologies, a n method can be associated either with a class (e.g. a class method or a static method) or with an object (e.g. an instance method). Methods provide a mechanism for accessing and manipulating the encapsulated data stored in an object.

As provided supra, programming flaws in methods and/or subroutines within application 230 can render application 230 vulnerable to attacks and/or security breaches. To harden application 230 against said attacks, security-hardening system 200 inserts sensors into the methods of application 230. The inserted sensors gather information snapshots from application 230.

The process of inserting sensors in application 230 is referred to as 'instrumentation'. Security hardening system 200 uses policy-management module 210 to govern the process of instrumenting application 230. In particular, with policy-management module 210, an administrative use can create and/or edit one or more security rules 302 that specify methods within application 230 that require instrumentation with one or more sensors. In addition, security rules 302 can also specify a pattern that signals a presence of a security attack, as well as, other information, such appropriate response actions.

Security-hardening system 200 uses instrumentation module 220 to insert passive, active, and response software sensors 314 in application 230 according to a set of security rules 302 specified with policy-management module 210. In particular, instrumentation module 220 includes an instrumentation manager 304 and instrumentation agent 305. Instrumentation agent 305 processes security rules 302. Security rules 302 specify the methods requiring instrumentation and/or direct instrumentation agent 305 to install sensors into the specified methods of application 230. Hardenings 320 (e.g. hardening instructions) can be associated with passive, active, and response software sensors 314. Hardenings 320 can implement various hardening processes such as process 400, process 1900, etc.

It is noted that in some embodiments, not all methods need to be instrumented. For example, some methods are not relevant to security. Accordingly, there may be little point of instrumenting them, because instrumentation carries additional performance overhead. In contrast, other methods are relevant to many different security attacks and therefore need to be instrumented to determine how to protect against these attacks. Security rules 302 identify such methods as well as all other sources of security relevant information within the application and also specify conditions or patterns that, when triggered, indicate presence of hardening opportunities in the application.

Instrumentation agent 305 instruments application 230 by inserting passive, active, and response software sensors 314 into the methods specified by event objects in security rules 302. In some implementations, instrumentation agent 305 changes the code of application 230, but does not change any fields in the instrumented classes or methods. Therefore, no data, such as flags, bits, indicators, links, and/or any other is added in the instrumented methods or classes. As a result, execution of application 230 is not adversely affected. In other example embodiments, instrumentation agent 305 changes the state associated with methods or classes of application 230 to facilitate data tracking.

To facilitate rule creation and maintenance, rules may be en to enable instrumentation of multiple sources of security defense information in one application. By way of example, instrumentation can include parsing the binary codes of an application software as the binary codes are being loaded from a storage device to inject a monitor code. The parsed software code can then be executed by one or more hardware processors. The injection sites may be specific to the particular application software. Sensors can, gather information from the code of an application, configuration file libraries, frameworks, backend connections, and by interrogating the application using application programming interfaces (APIs).

Instrumentation agent 305 can instrument methods dynamically, statically, or by using a hybrid mode of instrumentation. Dynamic instrumentation includes inserting sensors in methods of application 230 during execution of application 230 through the use of an API designed for that purpose (e.g. a Java Instrumentation API, etc.). Another type of instrumentation is static instrumentation. In a static instrumentation example, the code of application 230 is instrumented with passive, active, and response software sensors 314 before application 230 begins to execute. In this example instrumentation agent 305 changes the source, object and/or executable code of application 230 to include the instructions or passive, active, and response software sensors 314 used for monitoring. In some implementations, hybrid instrumentation of application 230 is also possible, such that some methods of application 230 are instrumented statically, while other methods are instrumented dynamically when application 230 is executing.

Instrumentation module 220 can insert a number of different sensors into application 230. These sensors generate information snapshots whenever a sensor is invoked. Analysis module 240 collects the generated events (e.g. all generated events, etc.) during the operation of application 230. There exist three general types of sensors—"passive" sensors, "active" sensors, and "response" sensors. Attack analysis can occur throughout the execution of the application based on the data gathered from the sensors.

Passive sensors generate information snapshots that are analyzed by analysis module 240. Passive sensors are used to collect various types of data from the executing application 230 that is later used during hardening analysis. For example, a passive sensor informs analysis module 240 to capture an information snapshot. Information snapshots can include information associated with application 230, including, inter alia: the presence, status, and/or configuration of a security mechanism.

An active sensor implements one or more actions to gather data from the application. Active sensors can interrogate the application environment, configuration, framework and/or codebase to gather data. One type of active sensor monitors for Hypertext Transfer Protocol (HTTP) requests and responses and application server configuration. HTTP request and response sensors capture the HTTP traffic either received at and/or transmitted from the application server. HTTP response and request sensors may then use the captured HTTP traffic as part of attack analysis. For example, examining the HTTP response can enable some implementations to quickly and accurately identify security attacks such as, for example, parameter tampering, session hijacking and/or missing cross-site request forgery tokens. Application server configuration sensors, on the other hand, can access properties files, XML files, APIs, and other sources of configuration data and use that data as part of the attack analysis, such as the misconfiguration of defenses, improperly protected files, unencrypted passwords and many others. Another type of active sensor interrogates backend connections to determine their security characteristics. Other type of sensors are also possible to utilize as well. The information snapshots from these sensors may be combined with data from other sensors when identifying hardening opportunities.

A hardening action (e.g. implemented using hardenings 320) responds to a detected opportunity to improve the security defenses of the application. The range of possible hardening actions can include all of the hardening activities detailed above, as well as others. These hardening actions may be instrumented into the target application (e.g. application 230) and/or be delivered as standalone code to be invoked at runtime. Multiple hardening actions can be used to handle the different necessary opportunities to strengthen application defenses.

Performance of the sensor and hardening action installation and operation can use in the real-time operation of the security hardening system. One technique used to enhance the performance of the instrumentation process is to cache the required code changes as the sensors are installed in the codebase. As long as the policy does not change, the cached changes can be applied rather than reapplying the rules to the entire application each time the application starts. For example, the process of instrumenting the code such that application 230 starts can be sped up by caching.

Figure 4:
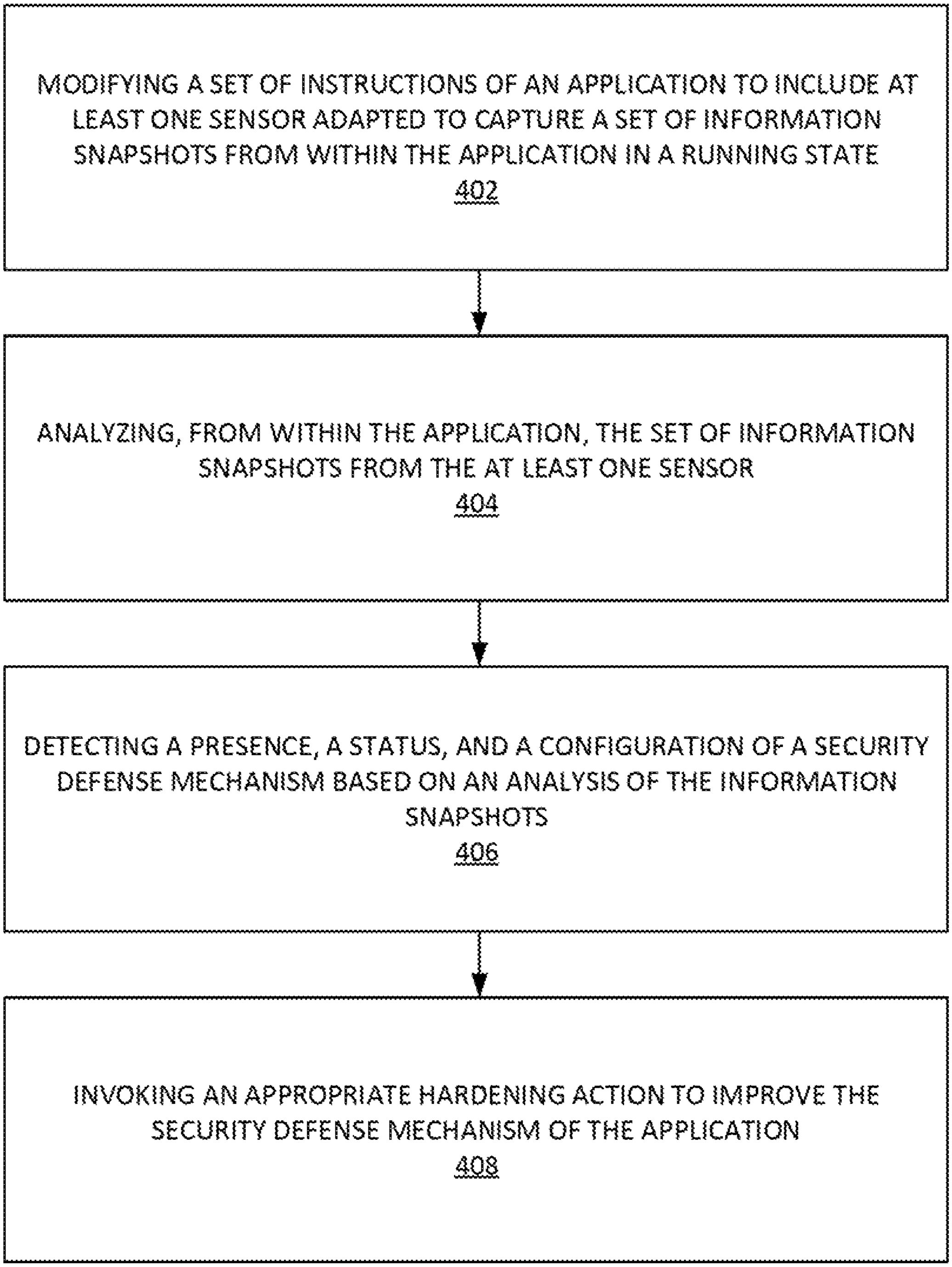
FIG. 4 illustrates an example security-hardening process, according to some embodiments.

FIG. 4 illustrates an example security-hardening process, 400, according to sore embodiments. In step 402, process 400 can modify a set of instructions of an application to include at least one sensor adapted to capture a set of information snapshots from within the application in a running state. In step 404, process 400 can analyze, from within the application, the set of information snapshots from the at least one sensor. In step 406, process 400 can detect a presence, a status, and a configuration of a security defense mechanism based on an analysis of the information snapshots. In step 402, process 400 can invoke an appropriate hardening action to improve the security defense mechanism of the application.

Figure 5:
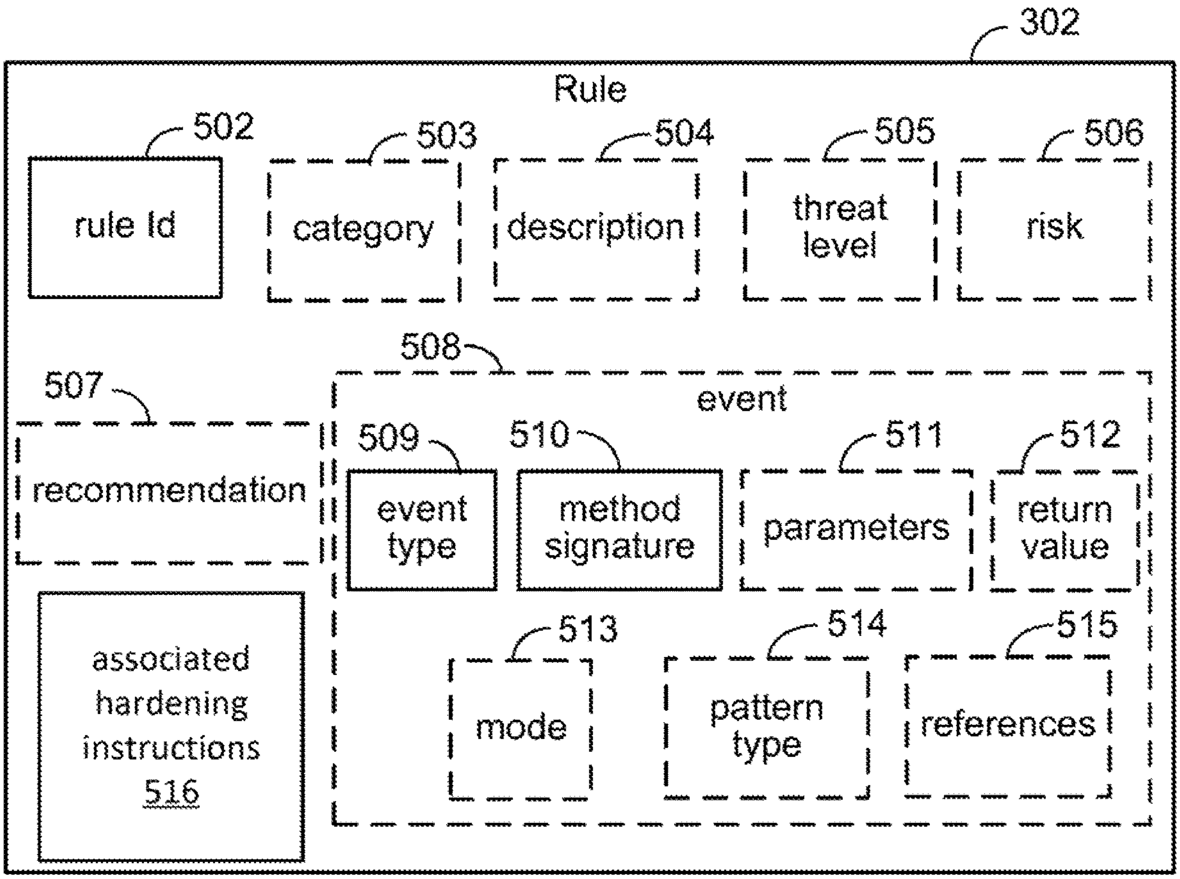
FIG. 5 is a block diagram of an example structure of a security rule, according to some embodiments.

FIG. 5 is a block diagram of an example structure of a security rule 302, according to some embodiments. Security rule 302 is a complex data structure. Security rule 302 can include various fields. Security rule 302 can include a security-rule identifier field 502. Security rule identifier field 502 is a text string and/or a number. Security-rule identifier field 502 uniquely identifies the security rule among other security rules. For example, security-rule identifier field 502 can be set to 'security rule #1'. Security rule 302 can also include a category field 503. Category field 503 provides the general category of the defense that security rule 302 is designed to improve, such as, inter alia: authentication, session management, authorization, validation and encoding, secure communications, encryption, caching, availability, etc.

In addition, security rule 302 can include a description field 504. Description field 504 provides the general description of the security rule and/or its purpose, such as, inter alia: "this security rule detects missing access controls in the application configuration and enables them with a safe configuration." Furthermore, security rule 302 can include an importance-level field 505. Importance-level field 505 indicates overall importance level of the defense improvement. For example, importance levels can be set to levels, such as 'low', 'medium', or 'high'. Security rule 302 can also include, a guidance field 507 that stores guidance to the user for handling the detected hardening opportunity.

In addition, security rule 302 includes a set of criteria 508 that comprise a pattern that is being detected by the security rule 302. These criteria can combine different types of events and application state information. When the state of application 230 meets the criteria defined by the rule, security-hardening system 200 invokes the associated hardening actions. Accordingly, security rule 302 can include associated hardening instructions 516.

Security rules 302 can check for a number of patterns that indicate weak or missing defenses, such as, inter alia: missing, weak, broken, or misconfigured communications, input validation, authentication authorization, encryption, logging, output escaping, parameterization, parser configuration, application server configuration, HTTP headers, and many more.

For example, security-hardening system 200 can check whether application 230 is properly defended against SQL injection. In this example, security-hardening system 200 analyzes the application to determine if SQL injection defenses are present, correct, properly invoked, and/or used in correct locations. If a SQL injection defense is determined to be missing or weak, then the hardening actions include enabling or strengthening the SQL injection defenses.

In another example, a security rule can be specified to detect a cross-site request forgery attack. In this example, the rule indicates how to check the application configuration to determine if an appropriate token check is applied to transactions. If the defense is determined to be disabled, the rule can enable that defense by invoking an API or modifying a configuration setting within the application.

While the foregoing is directed to examples of specific security rules, other security rules may be devised without departing from the basic scope thereof. It is noted that security rules 302 may be written to analyze and enhance any type of defense in application 230.

In another example embodiment, security-hardening system 200 can dynamically enhance the security of application based either internal or external conditions. Adaptive hardening is hardening that is performed dynamically as the application runs. A variety of runtime conditions detected by the invention can trigger enhanced defenses. For example, security-hardening system 200 can enable additional authentication defenses when it is determined that attackers are targeting the application. In additional examples, security-hardening system 200 can increase log levels, use stronger encryption, enable deeper attack detection technology, or require users to have increased privilege levels. Any defense can be enhanced at runtime by the invention, and additional examples will be obvious to one skilled in the art.

Figure 6:
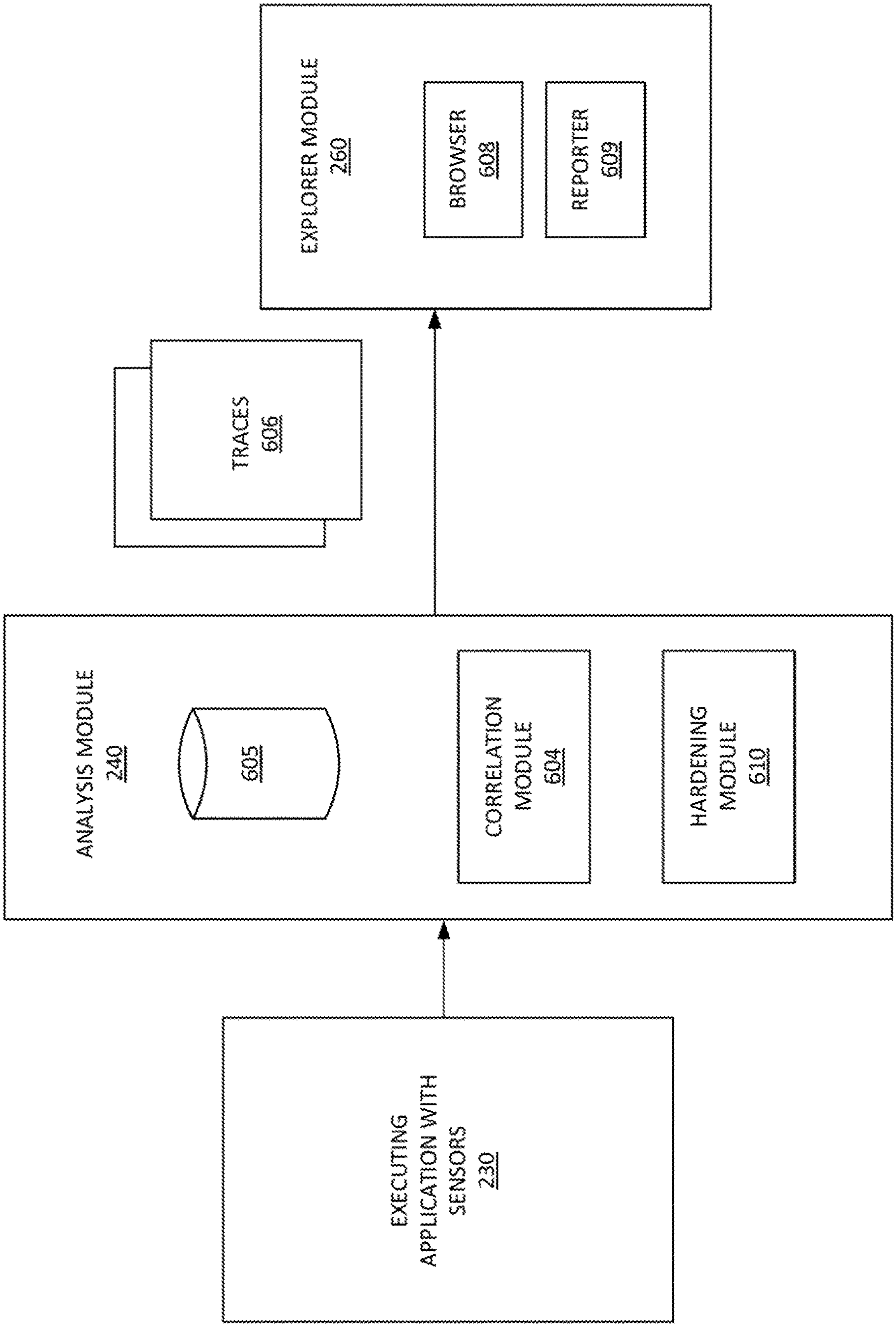
FIG. 6 is a block diagram of the security-hardening system, according to some embodiments.

FIG. 6 is a block diagram of the security-hardening system, according to some embodiments. Analysis module 240 begins to analyze the collected information snapshots as it is collected. Correlation module 604 can perform correlation between events. In some examples, this partial analysis can indicate required hardening. This can prevent further processing. In other examples, analysis can continue throughout the operation of an application, detecting hardening opportunities. In some examples, hardening can be indicated after an attacker has already been successful in exploiting the application. Security-hardening system 200 can utilize an explorer module 260 to manage the application hardening process across one or more applications. The explorer module 260 can include a browser module 608 and a configuration module 609. The browser module 608 provides a graphical user interface for viewing hardening configuration and results. The configuration module 609 is used to change the desired hardening configuration for one or more applications. Hardening module 610 can implement the various hardening functionalities provided herein (e.g. process 400, process 1900, etc.).

FIG. 7 illustrates an example of how analysis nodule detects a hardening opportunity for XSS prevention, according to some embodiments. Information snapshots from HTTP analysis and configuration files are used to detect an opportunity to enable the X-XSS-Protection HTTP header. Because the header is not present in HTTP responses and is not configured properly, the hardening action to enable that protection is invoked, thus modifying the application configuration at runtime. Other rules rely on different sensors and include a custom detection algorithm.

The security module 250 takes action from within the instrumented application 230 to add a defense enhance a defense, enable a defense, codify the configuration of a defense, or add an invocation of a defense where needed in the code. Other possible actions to harden an application for security will be obvious to one skilled in the art. For example, if a standard cross-site scripting defense is available, such as an output escaping defense, the security module could invoke the necessary code to enable that defense. Similarly, the security module could add a new output escaping module to an application and then add code to all the locations in the application to invoke the view module to defeat cross-site scripting attacks. In another example, the security module could replace a faulty output escaping module with one that properly escapes data.

Security-hardening system 200 can utilize an explorer module 260 to manage the application hardening process across one or more applications. The explorer module 260 can include a browser module 608 and a configuration module 609. The browser module 608 provides a graphical user interface for viewing hardening configuration and results. The configuration module 609 is used to change the desired hardening configuration for one or more applications.

FIG. 8 is a screen-shot illustrating an example attack 800 identified by analysis module 240, according to some embodiments. The attack 800 includes information associated with an attack pattern specified by the rule. The attack 800 includes data from one or more events received from the instrumented application 230. Attack data 801 can include information about the type of the event, context associated with the event, the method that generated the event as well as data 802 associated with the method. This data 802 can include input parameters, output values, and stack 803. In short, the event field 801 can include all or at least some of the information associated with the event, as described with respect to FIG. 4.

Figure 9:
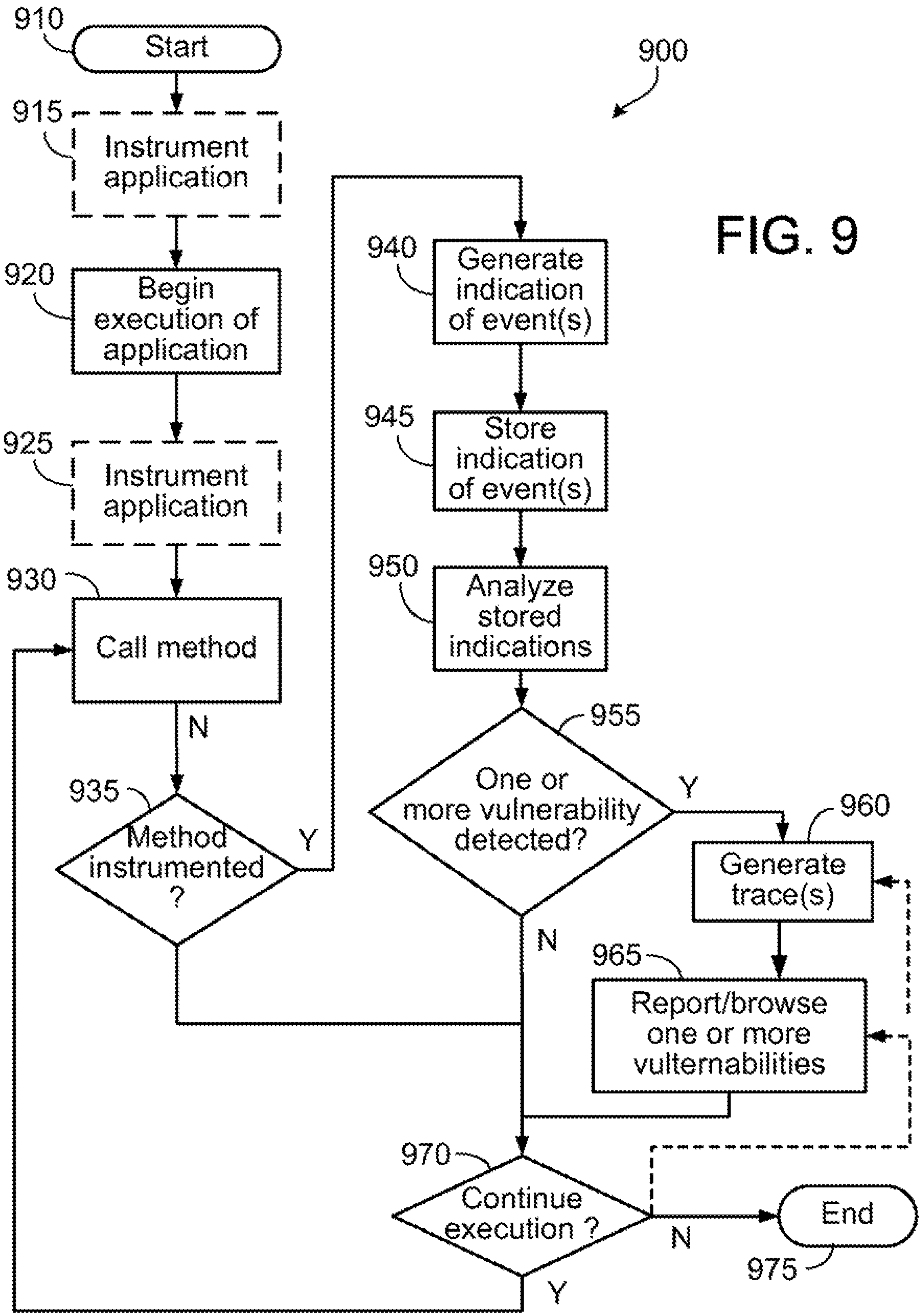
FIG. 9 is a flowchart illustrating example steps that can be executed by security hardening system, according to some embodiments.

FIG. 9 is a flowchart illustrating example steps 900 that can be executed by security hardening system 200, according to some embodiments. In the optional step 915, application 230 is instrumented with one or more sensors. Security-hardening system 200 uses instrumentation module 220 to instrument application 230 based on the security rules 302. In this step, application 230 is instrumented statically because it has not begun execution yet. In step 920, application 230 begins execution. In the optional step 925, application 230 is instrumented dynamically during its execution. As with static instrumentation, security-hardening system 200 uses instrumentation module 220 to instrument application 230 with sensors based on the requirements set forth in security rules 302. In step 930 one of application's 230 methods is invoked. If the called method has been instrumented with one or more sensors (step 935), then the installed sensor(s) in that method generate at least one the event (step 940). If the method is not instrumented, then an event is not generated and application 230 continues its execution. In step 945, the generated event is stored with other events in analysis module 240. In step 950, analysis module 240 analyzes the stored events and detects any possible attacks based on the analysis. If at least one attack is detected (step 955), analysis module 240 identifies a hardening opportunity (step 960). The explorer module 260 enhances application 230 with hardening (step 965). Notably, generation of attack reports and browsing, of results can occur while application 230 is executing or after it has completed execution. Therefore, a user can wait until application 230 has completed its execution to browse the results generated by security-hardening system 200. Alternatively, or in addition, a user can browse the results or be alerted about existence of attacks immediately after vulnerabilities are detected and/or while application 230 is still executing.

Figure 10:
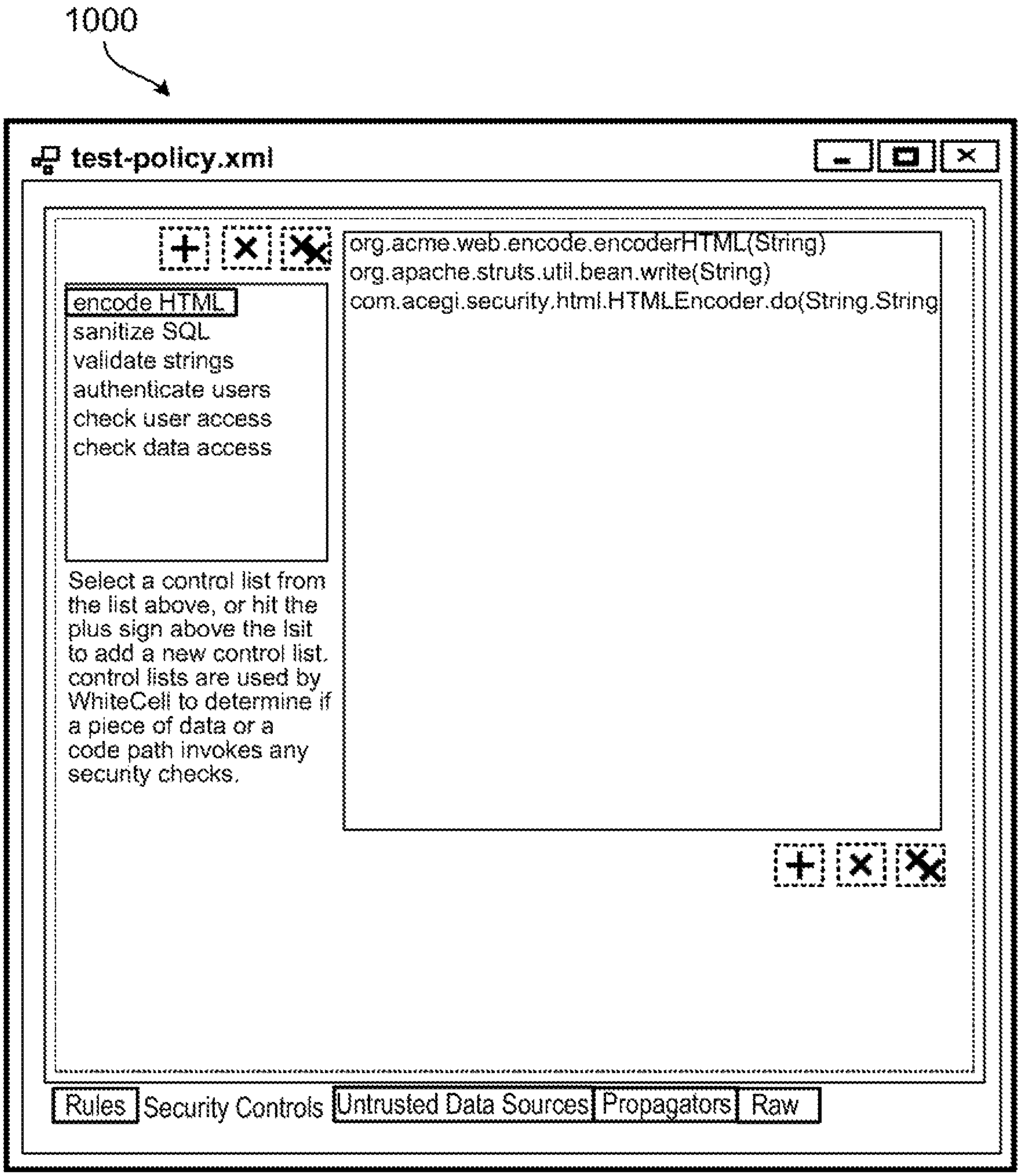
FIGS. 10 and 11 illustrate various aspects of a user interface used for configuring policies and rules for security-hardening system, according to some embodiments.
Figure 11:
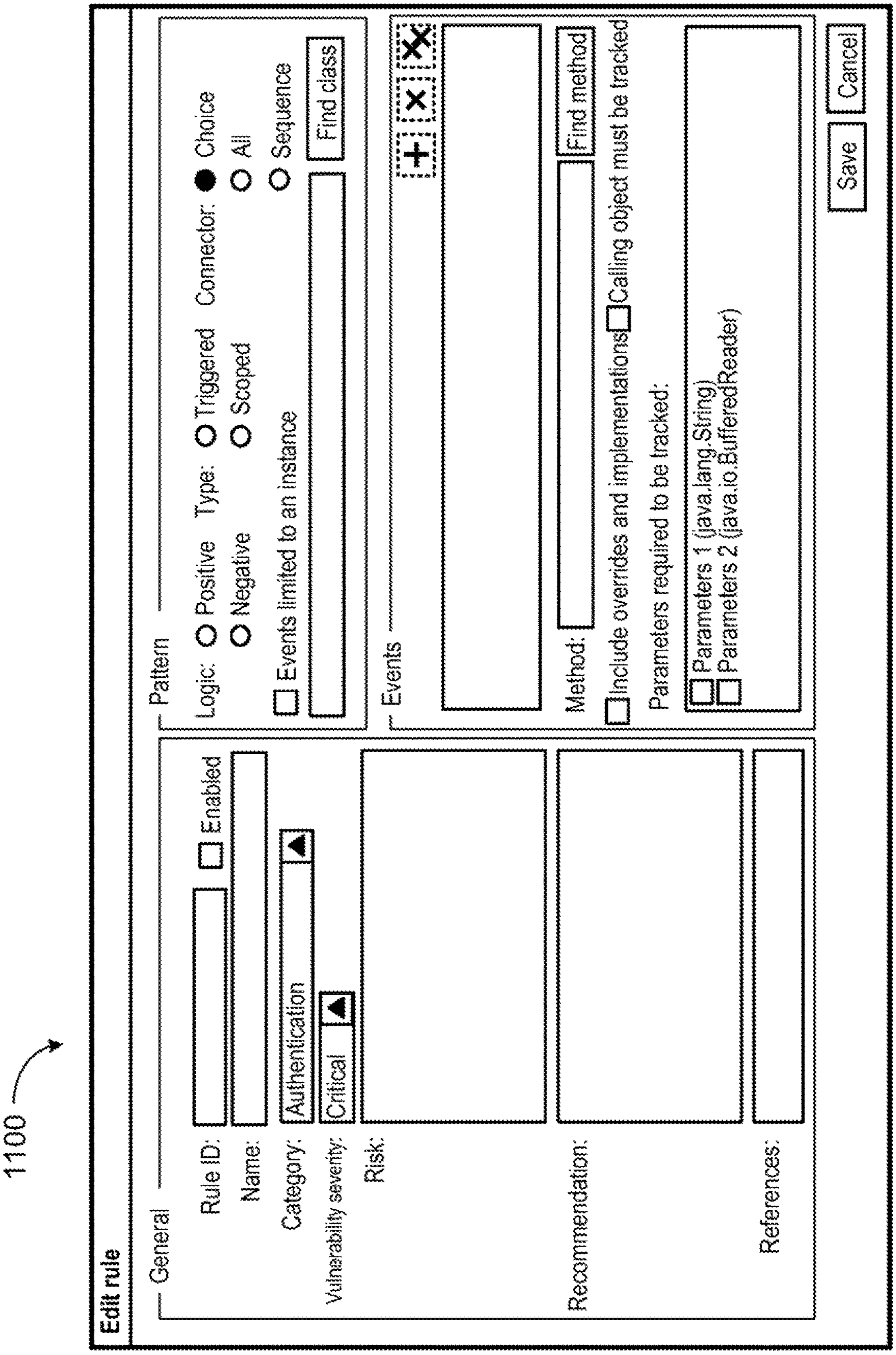

FIGS. 10-17 are screen-shots illustrating various aspects of an administrative interface used for accessing security-hardening system 200, according to some embodiments. In particular, FIGS. 10 and 11 illustrate various aspects of a user interface used for configuring policies and rules for security-hardening system 200, according to some embodiments. This interface, may be displayed to a user by the policy module 210. It is noted that FIGS. 10-17 include reference to WhiteCell as an example proprietary technology security service that implements various security technology that enables software applications to protect themselves against cyberattacks. However, other technology security services, such as those provided by Contrast Security®, can be utilized in lieu of WhiteCell.

FIG. 10 is a screen-shot illustrating an example Graphical User Interface (GUI) 1000 for an administrative interface used for accessing security-hardening system 200, according to some embodiments. The GUI 1000 includes various fields that enable an administrative user to specify security policies 1001 for application 230. Each security policy includes one or e security rules 1002 designed to detecting a particular type of application attack 230. In essence, a security policy is a collection of one or re security rules that are designed to identify one or more related attacks. Security polices can also be designed to ensure that security is enforced for particular components. For example, a user may create a policy that uses instrumentation to add, modify, enable, replace configure, or otherwise affect security defenses within the application. Other types of policies would be apparent to one of ordinary skill in the art and would depend on the specifics of a particular application.

FIG. 11 is a screen-shot of an example GUI 1100 used for selecting and managing security rules, according to some embodiments. One of ordinary skill would recognize that the GUI 1100 is only exemplary and may allow security rules to be managed across a port of applications in a variety of ways.

FIGS. 12-18 are screen-shots illustrating various aspects of a user interface used for reviewing results produced by security-hardening system 200, according to some embodiments. This interface may be displayed to a user by the explorer module 260.

Figure 12:
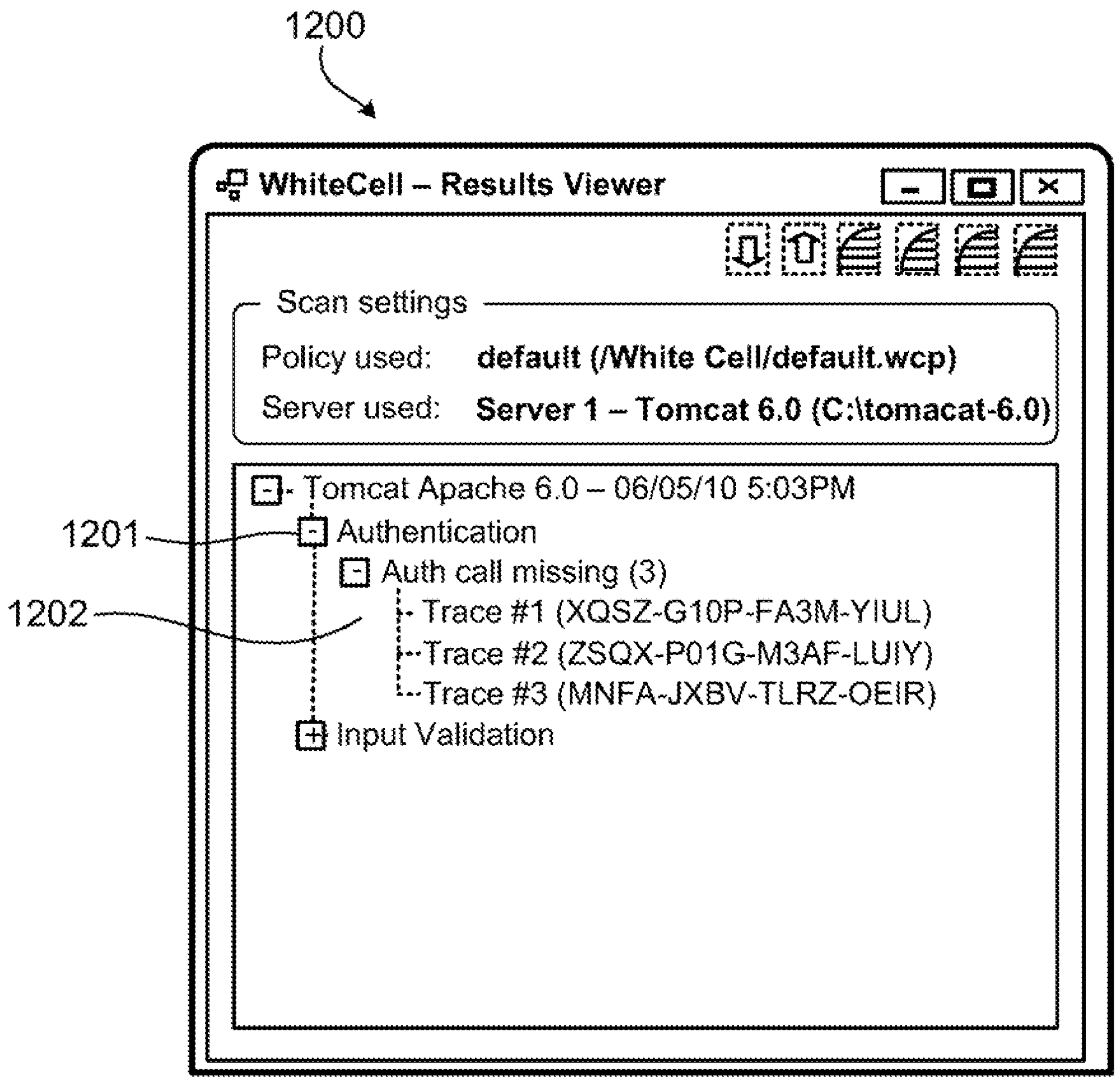
Figure 13:
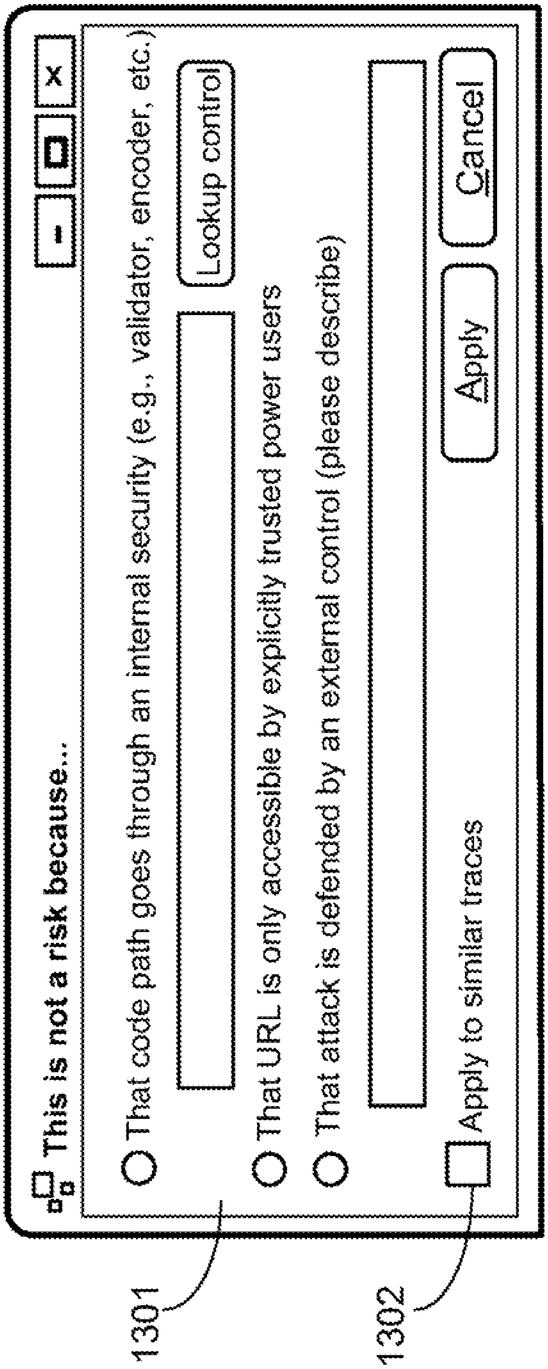

In particular, FIG. 12 is a screen-shot of an example GUI 1200 for browsing attacks identified by analysis module 240, according to some embodiments. The GUI 1200 enables an administrative user to browse and review attacks 1202 identified by security-hardening system 200. The traces (e.g. traces 606 of FIG. 6 supra) may be searched and sorted in a variety of ways (e.g. by vulnerability type, time, source IP address, attack content, severity, and more). By clicking on links to individual attacks 1202, the user can further drill down to the specific details of each collected attack. It is noted that upon further review, an administrative user may decide to perform various operations such as creating an exception, block an IP address, etc. FIG. 13 illustrates an example screen shot illustrating aspects of a user interface used for reviewing results produced by security-hardening system 200, according to some embodiments.

FIG. 14 is a screen-shot of an example GUI 1400 for reviewing an individual attack selected from the GUI 1300. The GUI 1400 includes a summary section 1401 that provide a high-level summary of the detected attack. For example, the summary section 1401 can include a short explanation of the attack's significance. In addition, the summary section 1401 can include an explanation of how the attack targeted the application.

Figure 15:
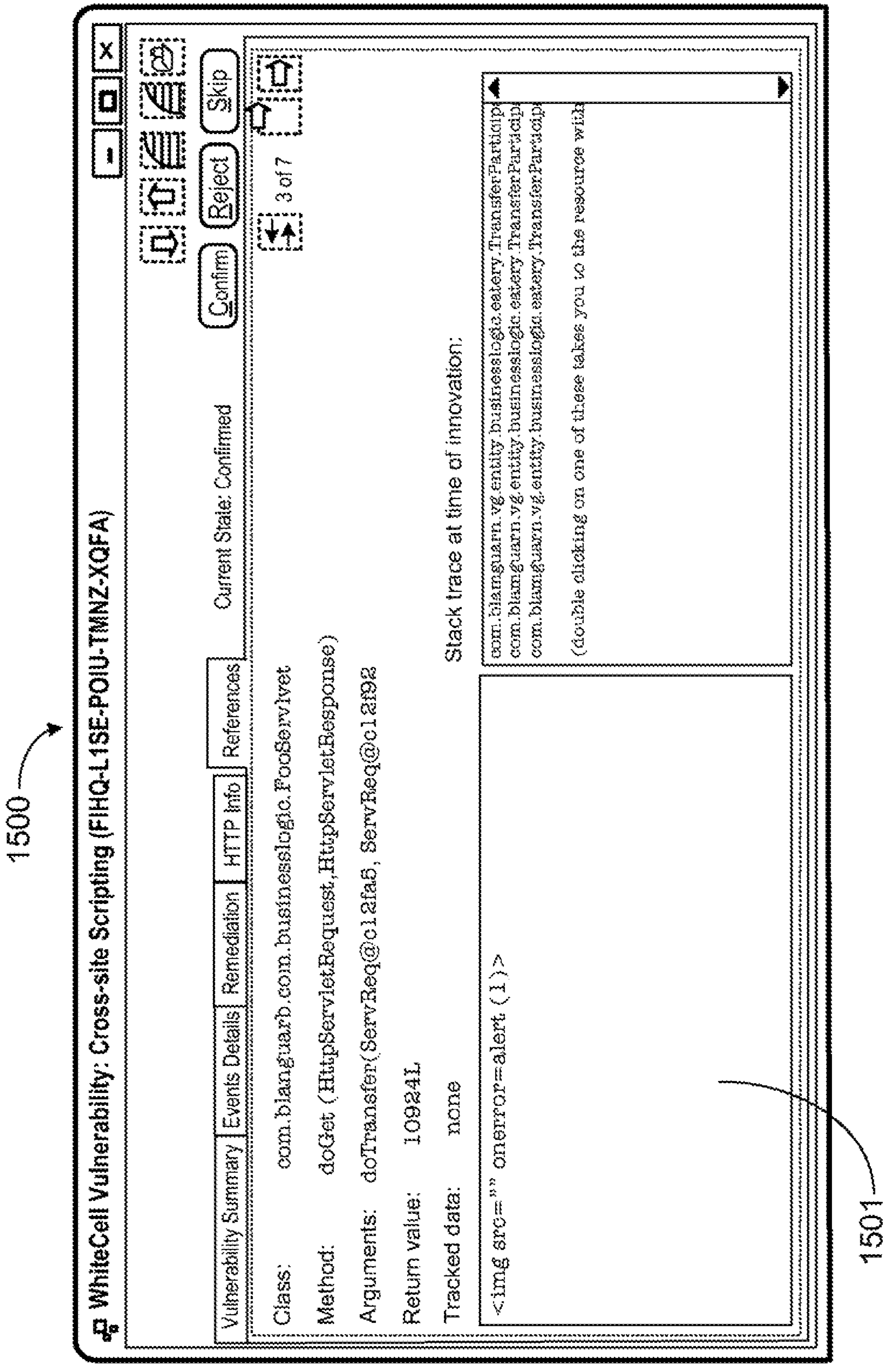
Figure 16:
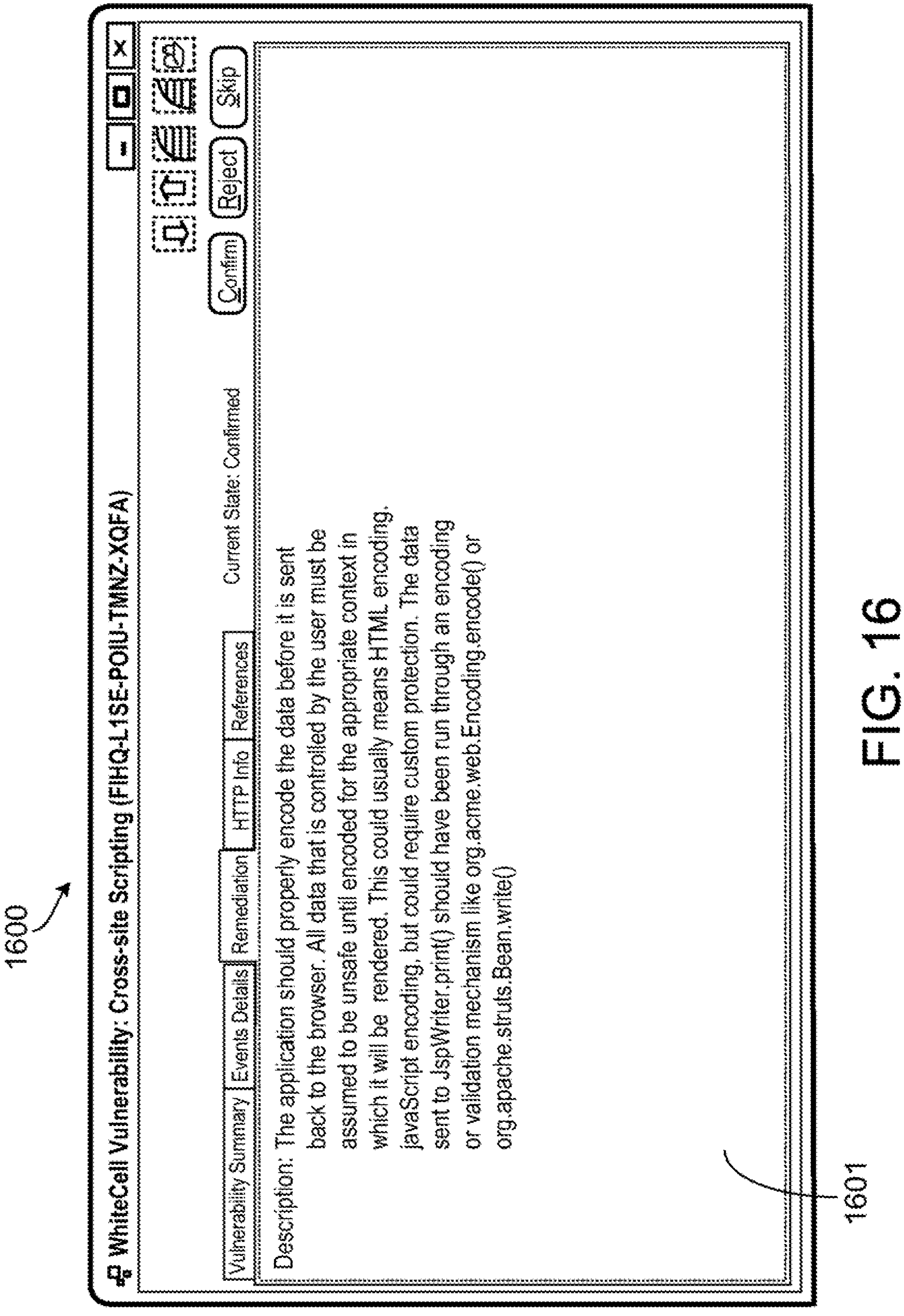
Figure 17:
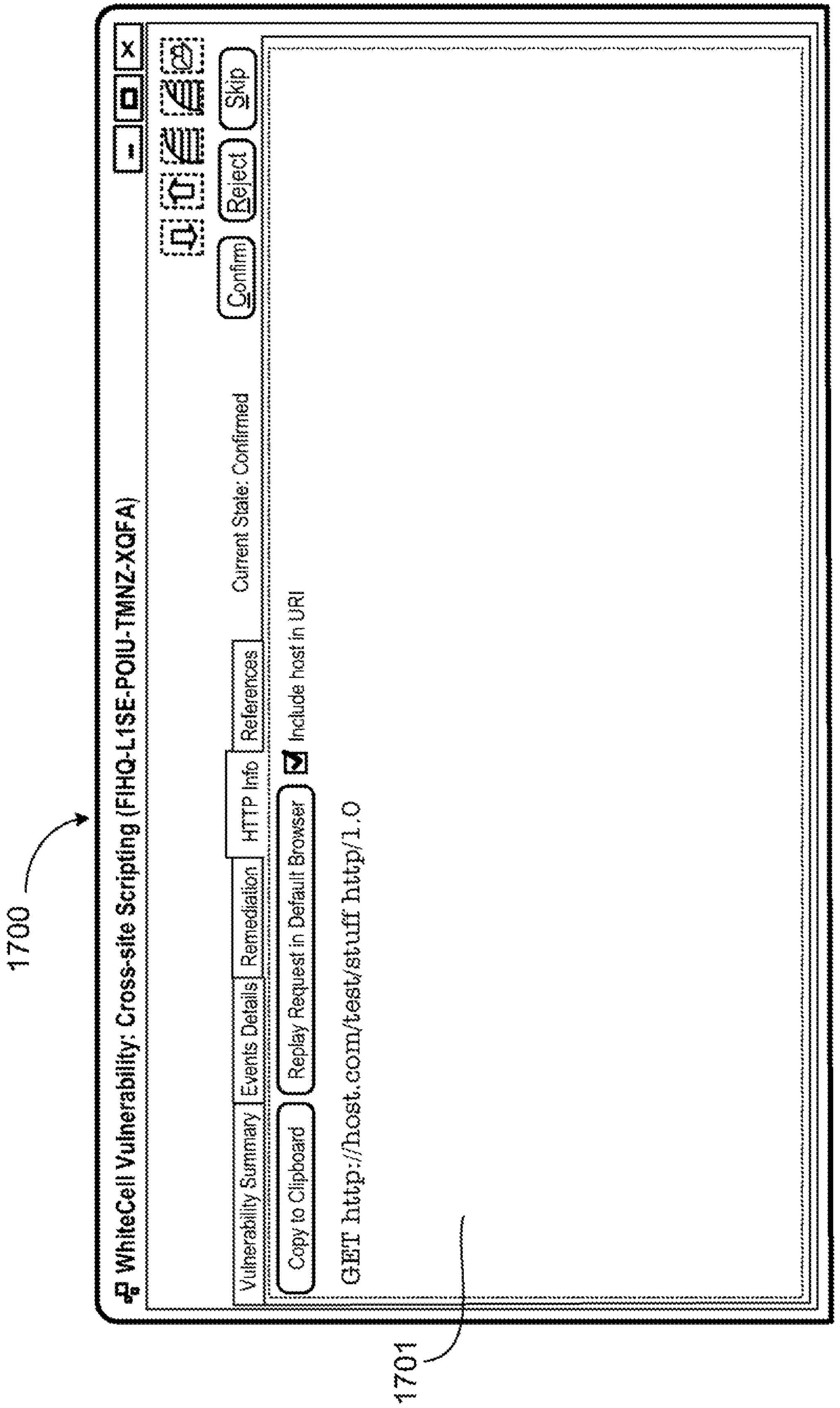
Figure 18:
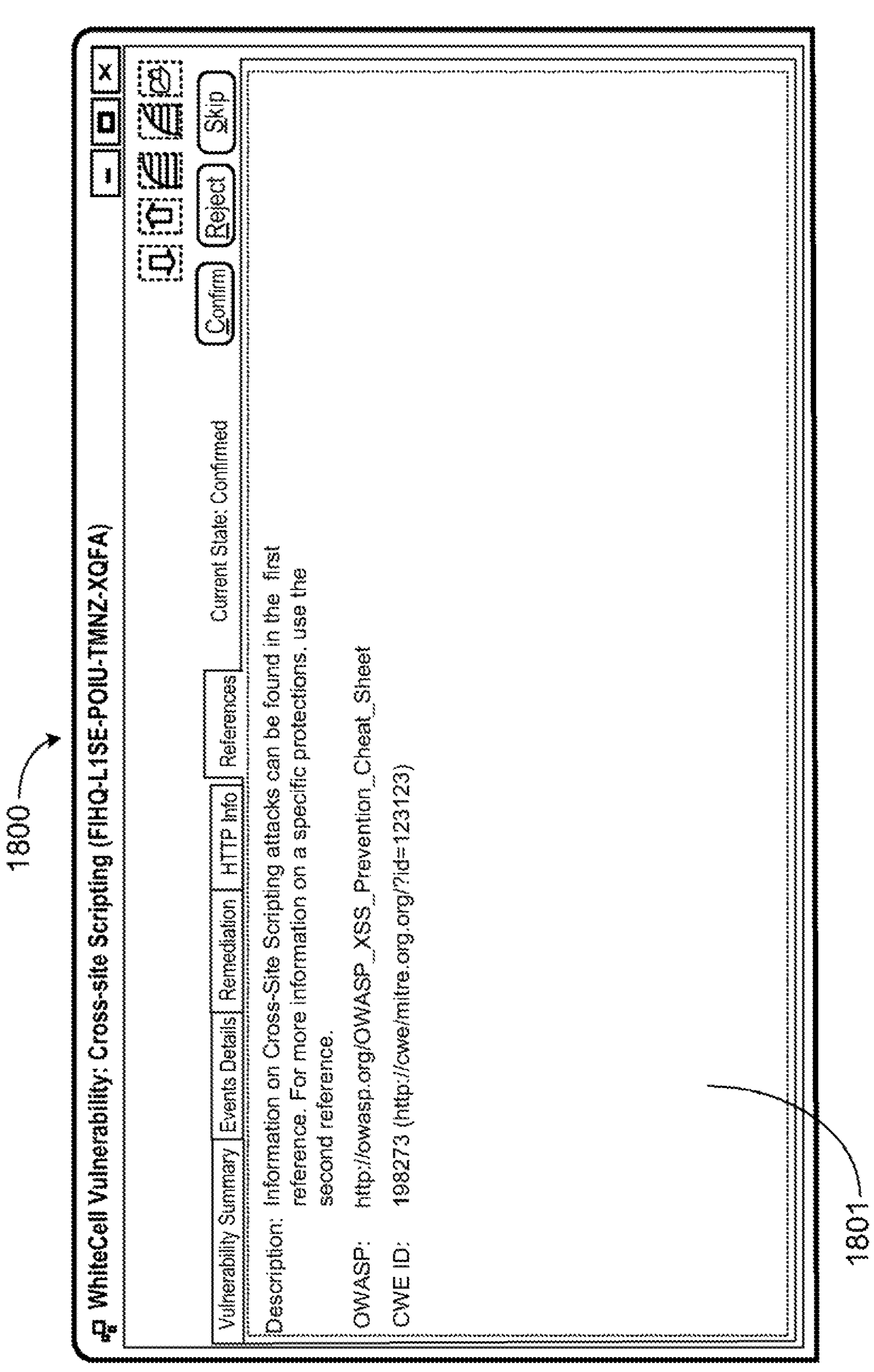

FIG. 15 is a screen-shot of an example GUI 1500 that provides the user with further detail about a detected attack report that was discussed with respect to FIG. 14, according to some embodiments. FIG. 15 includes various fields 1501 that provide further detail to user about the one or more events that triggered within the rule, according to some embodiments. For example, fields 1501 may include a class and a method associated with the triggered event. In addition, fields 1501 may include the method's arguments, the return value of the method, and the stack trace at the time of the method's invocation. Furthermore, fields 1501 may provide the user with any other information associated with the triggered event, such as information about any tracked data associated with the event.

Security-hardening system 200 can automatically generate a security rule to be enforced by an external device such as a web application firewall. This rule can be pushed automatically to the external device or could be handled b another process. The external security device can help mitigate an attack or the impact of a successful attack.

In another implementation, security-hardening system 200 automatically protects applications with known vulnerabilities. For example, the detection system can recognize that a particular application is using the Struts (e.g. Apache Struts, etc.) application framework (e.g., a standard in developing Web applications), and that a vulnerability exists in the manner which the Struts application framework is being used by the particular application. Accordingly, the system may automatically deploy a Struts-specific shield to prevent the known vulnerability from being exploited. A shield is a custom type of sensor that is instrumented into one or more locations in application 230 to prevent a vulnerability from being exploited. This example approach can be used to provide a shield for vulnerabilities in the custom code of the application.

One of ordinary skill would, of course, recognize that interfaces in FIGS. 11-18 are only exemplary and may each include fewer or more fields related to the details of security rules or detected hardening opportunities, depending on the specific details of rules or detected attacks.

Referring now to FIG. 19, example steps that can be executed in accordance with implementations of the present disclosure be described, according to some embodiments. The example steps of FIG. 19 can be executed using one or more processors coupled to a computer-readable storage medium at a computer system (e.g., the computer system 114 including, server 102) and/or a client device (e.g., the client devices 108, 110).

In step 1910, process 1900 can modify instructions of application to include at least one sensor that is configurable to generate an event indicator wherein event indicator includes at least some data associated with event. In step 1915, process 1900 can store the event indicator with other stored event indicators generated by the at least one, sensor during the execution of the application. In step 1920, process 900 can analyze, from within the application, the stored event indicator. In step 1925, process 1900 can detect a presence of at least one vulnerability in the application based on the analysis of the stored event indicators. In step 1930, process 1900 can report the presence of at least one vulnerability. In step 1935, process 1900 can detect a presence, a status, and a configuration of a security defense mechanism based on an analysis of the information snapshots. In step 1940, process 1900 can invoke an appropriate hardening action to improve the security defense mechanism of the application.

It is noted that security-hardening system 200 can be used in a variety of different environments and/or for different purposes. For example, an analyst can run application 230 with security-hardening system 200 to find out whether it is under attack, being exploited, or has vulnerabilities. The analyst may be able to run application 230 without requiring a special setup, environment or source code. The resulting output of security hardening system 200 would detail the security posture of the application.

In another example, an application owner without security knowledge carp run application 230 with security-hardening system 200 enabled, perhaps only focused on their particular code. In this example, security-hardening system 200 would produce warnings about identified and enhanced hardening opportunities ire the application.

And in yet another example, a security expert can add custom sensors and/or security rules to security-hardening system 200, thus tailoring the security hardening system's engine to the types of defense enhancements that are specific to the organization's business and technology. The expert can use security-hardening system 200 to gather information about how application 230 responds to simulated attacks during security testing. For example, security-hardening system 200 can report any violation of the rules involving any technology from application 230. Even patterns of code execution that are not typically thought of as defense problems can be identified by the security hardening system, such as unusual user behavior or atypical exception occurrences.

In some implementations, security-hardening system 200 can be used to protect applications sold and/or distributed from an application store. Such an application store may be any location where one or more software applications are available to users for activation or download. Examples of applications can include video game programs, personal information management programs, programs for playing media assets and/or navigating the media asset database, programs for controlling a telephone interface to place and/or receive calls, etc., These applications can be first developed by third parties and then uploaded to the application store, where they can be downloaded by the users of the store. Either the store operator or the end user ray use the security hardening system to defend the applications being downloaded.

Figure 20:
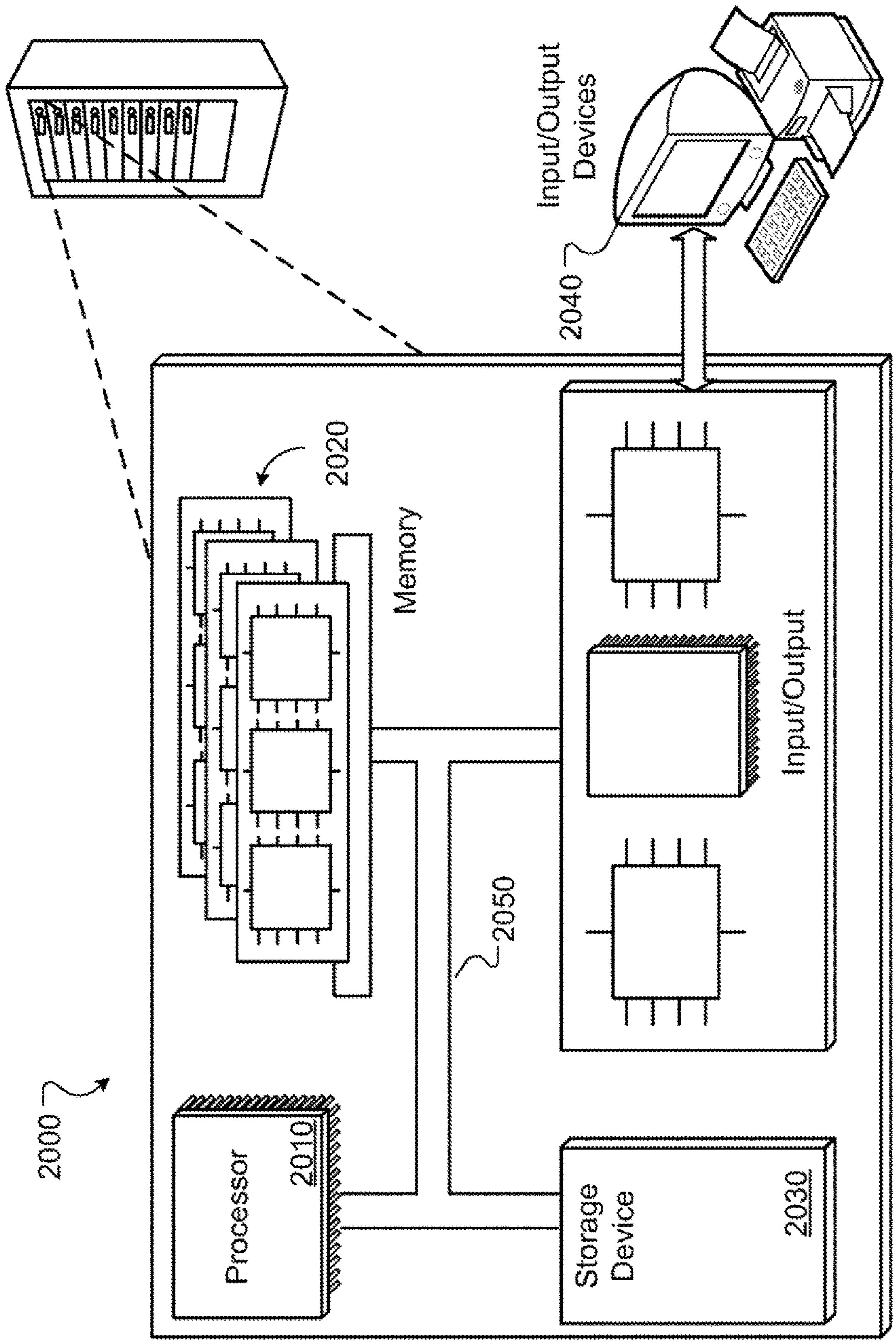
FIG. 20 is a schematic illustration of hardware components executing implementations of the present disclosure.

Referring now to FIG. 20, a schematic illustration of example hardware components that can be used to execute implementations of the present disclosure is provided, according to some embodiments. The system 2000 can be used for the operations described in association with the methods described in accordance with implementations of the present disclosure. For example, the system 2000 can be included in the application server 102 executing security-hardening system 200. The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit. Memory 1520 stores data, which typically comprises security rules, instructions, algorithms, code, or any other directives operable to enable the system to detect vulnerabilities. Stored data can be any suitable format such as, for example, an XML document, a flat file, CSV file, a name-value pair file, an SQL table, an HTML page a text message, or others. In addition, data can include instructions written in or based on any appropriate, computer language including C, C++, Java, Visual Basic, Perl, and others.

The storage device 2030 is capable of providing mass storage for the system 2000. In one implementation, the storage device 2030 is a computer-readable medium. In various different implementations, the storage device 2030 can be a floppy disk device, a hard disk device, an optical disk device, or a tape device. The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system at least one input device, and at least one output device. A computer program is a set of instructions that can be used, directly or indirectly, in a computer to perform a certain activity or bring about a certain result. A computer program can be written in any for programming language, including compiled or interpreted languages and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory, or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and movable disks; magneto-optical disks; and optical disks. Storage devices suitable for tangibly embodying computer program instructions and data include all form of non-volatile memory, including by way of example semiconductor memory devices, such as EPROM, EEPROM, and flash memory devices magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with user, the features can be implemented on a computer having a display device such as CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or are Internet server, or that includes a front-end component, such as a client computer having a graphical user interface or an Internet browser, or any combination of them. The components of the system can be connected by any form or medium of digital data communication such as a communication network. Examples of communication networks include e.g., a LAN a WAN, and the computers and networks forming the Internet. In addition, security-hardening system 200 can also operate in a hosted computing system, often referenced as "the cloud." Security-hardening system 200 can be stored and executed from a server system, rather than from a client device, thus allowing security-hardening system 200 to be shared easily between users. In addition, security-hardening system 200 can also be implemented to operate with wireless handheld and/or specialized devices. The computer system can include clients and servers. A client and server are generally remote from each other and typically interact through a network, such as the described cane. The relationship of client and server arises by virtue of computer programs running on the respective computers and having a client-server relationship to each other. However, one skilled in the art would recognize that any application, whether it embedded, mobile, desktop, server, or cloud, could use the described technology to detect vulnerabilities. Accordingly, one can use the described detection technology to monitor the running application and get notifications when the application violates the established policies.

In addition, the logic flows depicted in the figures do not require the particular order shown, or sequential order, to achieve desirable results. In addition, other steps can be provided or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

CONCLUSION

Although the present embodiments have been described with reference to specific example embodiments, various modifications and changes can be made to these embodiments without departing from the broader spirit and scope of the various embodiments. For example the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for hardening security of an application comprising:

modifying a set of instructions of an application to include at least one sensor adapted to capture a set of information snapshots from within the application when executed by one or more processors, in a running state;

capturing the set of information snapshots from within the application wherein the set of information snapshots comprises whether a set of defenses are enabled in the application and how said defenses are configured;

based on the set of information snapshots and from within the application and while the application is running, automatically generating a security rule of a security defense mechanism to be enforced by an external component by:

analyzing the set of information snapshots from the at least one sensor, detecting a presence, a status, and a configuration of security defense mechanism based on an analysis of the information snapshots of each of the at least one vulnerability is a pattern of application execution that is subject to abuse by a user of the application when the application is being executed by the same one or more processors, invoking an appropriate hardening action to improve the security defense mechanism of the application, wherein a set of hardening rules that control the hardening action are specified in an external configuration and related to the analysis of the information snapshots, wherein the step of invoking the appropriate hardening action to improve the security defenses of the application further comprises:

modifying a specified portion of code of the application for at least one method in the application;

invoking at least one method to change a state or a configuration of the application;

replacing the specified portion of code for at least one method in the application; and modifying an application file or another data store associated with the application to link a new security defense code into the application;

wherein the security defense mechanism comprises an authentication and forgery check, an authorization check, an input validation, an output escaping or encoding process, a data encryption, a logging process, a HTTP mechanism, a connection security process, a fraud prevention process, an integrity check, or a security filter; and automatically pushing the security rule to an external component; and enforcing the hardening action with the external component by automatically generating a security rule to be enforced by the external component, and automatically pushing the security rule to the external component, and wherein the external component comprises an operating system, web server, application server, network switch, network router, network firewall, or web application firewall.

2. The method of claim 1, wherein the application hardening is combined with an application vulnerability detection process or an application attack detection and prevention process.

3. The method of claim 1, wherein the application comprises a web application, a web service, an application programming interface (API), a mobile application, a client application, a server application, or an embedded application.

4. The method of claim 1, wherein the application comprises a set of components comprising at least one of a runtime platform, a virtual machine, a set of application servers, an application framework, an application library, or an application module.

5. The method of claim 1, wherein the set of information snapshots comprises information from a presence of a set of security defenses, the application library, the application framework, a software-architecture detail, an application state, a backend connection, or an application configuration information.

6. The method of claim 1, wherein the hardening action comprises an addition of a missing defense, a defense enhancement, an enabling of a defense, a modification of a defense configuration, or an addition of an invocation of the defense in a specified location of a set of code of the application.

7. The method of claim 1, wherein the security defense mechanism is centralized in the application module, wherein the security defense mechanism distributed across the application code.

8. The method of claim 1, wherein the security defense mechanism is located in the application platform, the application server, the application framework, the application library, the application module, the set of components used by the application, or a custom code segment of the application.

9. The method of claim 6, wherein the hardening action is defined by the user.

10. The method of claim 9, wherein the step of modifying the set of instructions of the application to include at least one sensor adapted to capture the set of information snapshots from within the application in a running state further comprises the step of:

dynamically patching the code segment at a run-time of the application.

11. The method of claim 10, wherein the code segment to be patched comprise a software component of the application or the application library.

12. The method of claim 1 wherein the at least one sensor comprises passive sensors, active sensors, or response sensors.

13. A computerized system useful for hardening security of an application comprising:

a computer store containing data, wherein the data comprises:

one or more hardening rules;

a computer processor in the computerized system, wherein the computer processor is configured to perform the steps of:

modify a set of instructions of an application to include at least one passive sensor adapted to capture a set of information snapshots from within the application when executed by one or more processors in a running state;

capture, with the passive sensor, the set of information snapshots from within the application, wherein the set of information snapshots comprises whether a set of defenses are enabled in the application and how said defenses area configured;

based on the set of information snapshots and form within the application and while the application is running, automatically generating a security rule of a security defense mechanism to be enforced by an external component:

analyze, from within the application and while the application is running, the set of information snapshots from the at least one passive sensor, detect a presence, a status, and a configuration of the security defense mechanism based on an analysis of the information snapshots each of the at least one vulnerability is a pattern of application execution that is subject to abuse by a user of the application when the application is being executed by the same one or more processors, and invoke an appropriate hardening action to improve the security defense mechanism of the application, wherein a set of hardening rules that control the hardening action are specified in an external configuration and related to the analysis of the information snapshots, wherein the step of invoking the appropriate hardening action to improve the security defenses of the application further comprises:

modifying a specified portion of code of the application for at least one method in the application;

invoking at least one method to change a state or a configuration of the application;

replacing the specified portion of code for at least one method in the application; and modifying an application file or another data store associated with the application to link a new security defense code into the application;

wherein the security defense mechanism comprises an authentication and forgery check, an authorization check, an input validation, an output escaping or encoding process, a data encryption, a logging process, a HTTP mechanism, a connection security process, a fraud prevention process, an integrity check, or a security filter;

automatically causing the security rule to be pushed to an external component; and enforce the hardening action with the external component, and wherein the external component comprises an operating system, web server, application server, network switch, network router, network firewall, or web application.

14. The computerized system of claim 13, wherein the application hardening is combined with an application vulnerability detection process or an application attack detection and prevention process.

15. The method of claim 14, wherein the application comprises a web application, a web service, application programming interface (API), a mobile application, a client application, a server application, or an embedded application.

16. The method of claim 15, wherein the application comprises a set of components comprising at least one of a runtime platform, a virtual machine, a set of application servers, an application framework, an application library, or an application module.

* * * * *